(12) United States Patent
Reichwein et al.

(10) Patent No.: US 7,254,550 B2
(45) Date of Patent: Aug. 7, 2007

(54) INTERACTIVE SYMPTOMATIC RECORDING SYSTEM AND METHOD UTILIZING SYMPTOMATIC MEMORY

(75) Inventors: Ernst F. Reichwein, Littleton, CO (US); Joseph G. White, Littleton, CO (US)

(73) Assignee: Reichwein & White Enterprises, Littleton, CO (US)

( * ) Notice: Subject to any disclaimer, the term of this patent is extended or adjusted under 35 U.S.C. 154(b) by 1020 days.

(21) Appl. No.: 09/977,182

(22) Filed: Oct. 12, 2001

(65) Prior Publication Data

US 2002/0040328 A1 Apr. 4, 2002

Related U.S. Application Data

(63) Continuation-in-part of application No. 09/880,973, filed on Jun. 14, 2001, now abandoned, and a continuation-in-part of application No. 09/122,404, filed on Jul. 25, 1998, now Pat. No. 6,311,162, said application No. 09/880,973 is a continuation of application No. 09/122,404.

(51) Int. Cl.
 *G06Q 30/00* (2006.01)
(52) U.S. Cl. ............... 705/26; 705/8; 705/9; 705/29; 705/30; 707/10
(58) Field of Classification Search ............... 702/182, 702/184; 701/29, 31–35; 340/10.1, 933; 705/2–3, 10
See application file for complete search history.

(56) References Cited

U.S. PATENT DOCUMENTS

| | | | |
|---|---|---|---|
| 4,375,672 A * | 3/1983 | Kato et al. ............... 701/102 |
| 4,449,186 A | 5/1984 | Kelly et al. ............... 705/5 |
| 4,602,127 A | 7/1986 | Neely et al. ............... 379/68 |
| 4,851,705 A * | 7/1989 | Musser et al. ............ 307/10.1 |
| 4,916,441 A | 4/1990 | Gombrich ............... 345/169 |
| 4,975,847 A | 12/1990 | Abe et al. ............... 701/32 |
| 4,989,146 A * | 1/1991 | Imajo ............... 701/35 |
| 5,056,023 A | 10/1991 | Abe ............... 701/32 |
| 5,058,044 A * | 10/1991 | Stewart et al. ............ 702/184 |
| 5,107,428 A | 4/1992 | Bethencourt et al. ......... 701/35 |
| 5,128,862 A | 7/1992 | Mueller ............... 705/15 |

(Continued)

FOREIGN PATENT DOCUMENTS

| | | |
|---|---|---|
| EP | 0 248 137 | 12/1987 |
| EP | 0 748 080 | 9/1989 |
| EP | 0 333 620 | 12/1996 |

*Primary Examiner*—Cuong Nguyen
(74) *Attorney, Agent, or Firm*—Holland & Hart LLP

(57) ABSTRACT

The Internet provides communication between a plurality of service sites and a plurality of equipment sites at which equipment needing periodic service and emergency service are operated. Each piece of equipment includes a sensor array and a manual actuator that is activated when an abnormal mode of operation of the equipment is experienced. When the manual actuator on a piece of equipment is actuated, the equipment's operating conditions that are sensed by the sensor array are stored in memory. Later, when a request to service the equipment is sent from an equipment site to a service site, the service site queries the equipment site as to equipment symptoms. Upon receiving this query, an operator at the equipment site causes the symptoms stored in memory to be transmitted to the service site. Based upon the symptoms received at the service site, a service plan for the equipment is formulated.

14 Claims, 56 Drawing Sheets

U.S. PATENT DOCUMENTS

| | | | | |
|---|---|---|---|---|
| 5,132,905 | A | 7/1992 | Takai et al. | 701/33 |
| 5,214,582 | A | 5/1993 | Gray | 701/33 |
| 5,404,443 | A | 4/1995 | Hirata | 725/75 |
| 5,459,660 | A * | 10/1995 | Berra | 701/33 |
| 5,488,575 | A | 1/1996 | Danielson et al. | 713/321 |
| 5,491,631 | A * | 2/1996 | Shirane et al. | 701/35 |
| 5,499,707 | A | 3/1996 | Steury | 194/217 |
| 5,513,107 | A | 4/1996 | Gormley | 701/48 |
| 5,514,582 | A * | 5/1996 | Capon et al. | 435/252.3 |
| D370,478 | S | 6/1996 | Swift et al. | D14/427 |
| 5,528,499 | A * | 6/1996 | Hagenbuch | 701/50 |
| 5,533,093 | A | 7/1996 | Horton et al. | 379/21 |
| 5,537,315 | A * | 7/1996 | Mitcham | 705/4 |
| 5,539,428 | A | 7/1996 | Bril et al. | 345/471 |
| 5,539,429 | A | 7/1996 | Yano et al. | 345/173 |
| 5,541,840 | A | 7/1996 | Gurne et al. | 701/33 |
| 5,557,268 | A * | 9/1996 | Hughes et al. | 340/933 |
| 5,557,515 | A | 9/1996 | Abbruzzese et al. | 705/9 |
| 5,568,037 | A | 10/1996 | Massaroni | 320/106 |
| 5,592,378 | A | 1/1997 | Cameron et al. | 705/27 |
| 5,644,619 | A | 7/1997 | Farris et al. | 379/29.01 |
| 5,650,930 | A * | 7/1997 | Hagenbuch | 701/50 |
| 5,657,224 | A * | 8/1997 | Lonn et al. | 701/29 |
| 5,687,212 | A | 11/1997 | Kinser, Jr. et al. | 379/9.03 |
| 5,729,452 | A * | 3/1998 | Smith et al. | 701/29 |
| 5,730,526 | A * | 3/1998 | Davis et al. | 374/45 |
| 5,737,728 | A | 4/1998 | Sisley et al. | 705/8 |
| 5,790,119 | A | 8/1998 | Sklut et al. | 715/839 |
| 5,826,239 | A | 10/1998 | Du et al. | 705/8 |
| 5,835,871 | A * | 11/1998 | Smith et al. | 701/29 |
| 5,852,819 | A | 12/1998 | Beller | 707/1 |
| 5,875,430 | A * | 2/1999 | Koether | 705/1 |
| 5,877,961 | A | 3/1999 | Moore | 700/180 |
| 5,884,202 | A * | 3/1999 | Arjomand | 701/29 |
| 5,895,432 | A * | 4/1999 | Zarchy | 701/2 |
| 5,916,287 | A * | 6/1999 | Arjomand et al. | 701/29 |
| 5,924,074 | A | 7/1999 | Evans | 705/3 |
| 5,933,136 | A | 8/1999 | Brown | 715/741 |
| 5,937,388 | A | 8/1999 | Davis et al. | 705/8 |
| 5,941,918 | A * | 8/1999 | Blosser | 701/29 |
| 5,957,985 | A * | 9/1999 | Wong et al. | 701/33 |
| 5,974,388 | A | 10/1999 | Durham | 705/1 |
| 6,009,355 | A * | 12/1999 | Obradovich et al. | 701/1 |
| 6,047,259 | A | 4/2000 | Campbell et al. | 705/3 |
| 6,285,932 | B1 * | 9/2001 | de Bellefeuille et al. | 701/33 |
| 6,314,422 | B1 * | 11/2001 | Barker et al. | 707/10 |
| 6,405,111 | B2 * | 6/2002 | Rogers et al. | 701/33 |
| 6,694,277 | B2 * | 2/2004 | Schneider et al. | 702/104 |
| 6,819,986 | B2 * | 11/2004 | Hong et al. | 701/29 |
| 6,865,458 | B1 * | 3/2005 | Kim | 701/36 |
| 6,877,354 | B2 * | 4/2005 | Bayerle et al. | 73/1.06 |
| 2002/0016655 | A1 * | 2/2002 | Joao | 701/35 |

* cited by examiner

Fig. 12C

CUSTOMER'S INFORMATION:
- CUSTOMER INFORMATION:
  - JOHN DOE [CHANGE]
  - 1234 HIS WAY ST. [CHANGE]
  - ANYTOWN, USA 12345 [CHANGE]
- CITY, STATE, ZIP:
  - ANYTOWN, USA 12345 [<]
  - 1 2 3 4 5 6 7 8 9 0 -
  - Q W E R T Y U I O P
  - A S D F G H J K L .
  - Z X C V B N M
  - [CLEAR] [SPACE] [DONE]

Fig. 12D

CUSTOMER'S INFORMATION:
- CUSTOMER INFORMATION:
  - JOHN DOE [CHANGE]
  - 1234 HIS WAY ST. [CHANGE]
  - ANYTOWN, USA 12345 [CHANGE]
- CUSTOMER VEHICLE
  - VEHICLE LICENSE #:
  - [CHANGE] BRT-1234 ▶
  - VEHICLE DESCRIPTION:
  - DODGE RAM 350, FORREST GREEN, 2001 ▶
  - [OK] [BACK]

MAIN MENU

PLEASE INDICATE THE GENERAL AREA IN WHICH THE PROBLEM IS OCCURRING. IF YOUR VEHICLE REQUIRES ONLY MAINTENANCE SERVICE, AND THERE ARE NO PROBLEMS AT THE PRESENT TIME PLEASE PRESS NUMBER EIGHT ON THE SERVICE MENU. IF YOUR PROBLEM OR REQUEST DOES NOT FALL WITHIN THE CATERGORIES LISTED, PRESS NUMBER EIGHT.

TOUCH THE AREA OR AREAS BELOW, THEN TOUCH DONE.

☐ 1. ENGINE / DRIVEABILITY

☐ 2. NOISES / VIBRATIONS

☐ 3. AUTOMATIC / MANUAL / 4 WHEEL DRIVE TRANSMISSION

☐ 4. HEATER / AIR CONDITIONING

☐ 5. BRAKES

☐ 6. STEERING / SUSPENSION

☐ 7. POWER ACCESSORIES / ELECTRICAL

☐ 8. OTHER SERVICES

[DONE]    [HELP]

ENTER CONTACT PHONE NUMBERS:

WELCOME TO THE JACK'S BMW. THIS SERVICE EXPRESS WRITER IS DESIGNED TO LESSEN YOUR TIME WAITING FOR SERVICE. AT THE SAME TIME IT INCREASES THE ACCURACY OF THE DESCRIPTION OF YOUR PROBLEM GIVEN TO THE TECHNICIAN WHO WILL WORK ON YOUR VEHICLE. WE HOPE YOU ENJOY THE EXPERIENCE.

PLEASE ENTER THE PHONE NUMBER(S) WHERE YOU CAN BE REACHED AT TODAY

PHONE NUMBERS:

[CHANGE] (303)333-4444

[CHANGE] (303)333-4444

[DONE]    [BACK]    [HELP]

Fig. 12G

ENGINE / DRIVEABILITY SECTION

THE FOLLOWING QUESTIONS ARE DESIGNED TO DELIVER VALUABLE INFORMATION TO THE SERVICE TECHNICIAN WHO WILL WORK ON YOUR VEHICLE. PLEASE TOUCH THE APPROPRIATE NUMBER FOR YOUR VEHICLE'S SYMPTOM. PLEASE ONLY USE THE PEN PROVIDED TO YOU.

1. SYMPTIONS WHEN STARTING
2. SYMPTOMS WHEN DRIVING
3. OTHER SYMPTOMS

[1] [2] [3]    [BACK] [HELP]

Fig. 14A

SYMPTOMS WHEN STARTING:

TOUCH THE APPROPRIATE SYMPTOM OR SYMPTOMS BELOW.

☐ DOES NOT TURN OVER.
☐ TURNS OVER, BUT DOES NOT START.
☐ TURNS OVER SLOWLY.
☐ TURNS OVER PROPERLY, BUT STARTS HARD.
☐ TAKES TOO LONG BEFORE IT STARTS.
☐ I MUST PRESS THE GAS PEDAL HARD TO MAKE THE ENGINE START.
☐ STARTS OK., BUT THAN STALLS.
☐ NONE OF THE ABOVE STARTING SYMPTOMS.

[OK]  [BACK] [HELP]

Fig. 14B

SYMPTOMS WHEN DRIVING:

TOUCH THE APPROPRIATE SYMPTOM OR SYMPTOMS BELOW.

☐ HESITATES OR STALLS WHEN SPEEDING UP.
☐ STALLS WHEN I SLOW DOWN OR STOP.
☐ STALLS WHEN TURNING RIGHT OR LEFT.
☐ LACKS POWER AT HIGHWAY SPEED.
☐ LACKS POWER BELOW HIGHWAY (CITY) SPEEDS.
☐ ENGINE BACKFIRES (LOUD POPPING NOISE)
☐ ENGINE KEEPS RUNNING WHEN IGNITION KEY IS OFF.
☐ SPEEDS UP OR SLOWS DOWN UNEXPECTEDLY.
☐ POOR FUEL ECONOMY.
☐ NONE OF THE ABOVE DRIVING SYMPTOMS.

[OK]   [BACK]   [HELP]

WHEN DO YOU NOTICE IT:
WHEN DO YOU NOTICE THE SYMPTOMS? TOUCH THE APPROPRIATE BOX OR BOXES.
○ COLD   ● NORMAL   ○ HOT   ○ ANY TEMP

WHEN THE ENGINE'S RPM SHOWS:
○ BELOW 1000   ○ 1000 TO 2000   ○ 2000 TO 4000
○ OVER 4000 RPM   ● NOT APPLICABLE

WHEN THE VEHICLE IS:
○ WARMING UP        ○ STARTING COLD
○ RESTARTING HOT    ● NOT APPLICABLE

DOES THE "CHECK ENGINE" LIGHT COME ON:
○ YES   ● NO

THE SYMPTOMS OCCURE WHEN MY VEHICLE'S
SPEED IS (MPH)
○ 0 TO 20   ○ 20 TO 35   ○ 35 TO 55
○ OVER 55 MPH   ● DOESN'T MATTER

THE SYMPTOM OCCURES WHEN I DRIVE FOR:
○ UNDER 5 MILES   ○ 5 TO 10 MILES
○ OVER 10 MILES   ● DOESN'T MATTER

[OK]   [BACK]   [HELP]

*Fig. 14C*

NOISE INFORMATION:

LISTED BELOW ARE EXAMPLES OF NOISES COMMONLY FOUND COMING FROM YOUR VEHICLE. TOUCH THE APPROPRIATE BOX OR BOXES THAT BEST DESCRIBES THE NOISES YOU ARE HEARING.

- ☐ SQUEAK
- ☐ RATTLE
- ☐ WHISTLE
- ☐ HUM
- ☐ BUZZ
- ☐ CHIRP
- ☐ SQUEAL
- ☐ [CLUNK]

- ☐ TAP
- ☐ CLICK
- ☐ GRIND
- ☐ GROWL
- ☐ KNOCK
- ☐ METAL CLANG
- ☐ RUMBLE
- ☐ NONE OF THE ABOVE

[OK]  [BACK]  [HELP]

NOISE OR VIBRATION SELECTION:

THE FOLLOWING QUESTIONS ARE DESIGNED TO DELIVER VALUABLE INFORMATION TO THE SERVICE TECHNICIAN WHO WILL WORK ON YOUR VEHICLE. PLEASE TOUCH THE APPROPRIATE NUMBER FOR YOUR VEHICLE'S SYMPTOM.

1. NOISES-WHAT YOU CAN HEAR.
2. VIBRATIONS-WHAT YOU CAN FEEL.
3. BOTH NOISES AND VIBRATIONS.

[1] [2] [3]        [BACK]  [HELP]

*Fig. 15A*

TRANSMISSION INFORMATION:

THE FOLLOWING QUESTIONS ARE DESIGNED TO DELIVER VALUABLE INFORMATION TO THE SERVICE TECHNICIAN WHO WILL WORK ON YOUR VEHICLE. PLEASE TOUCH THE APPROPRIATE NUMBER FOR YOUR VEHICLE'S SYMPTOM. PLEASE ONLY USE THE PEN PROVIDED TO YOU.

1. AUTOMATIC TRANSMISSION

2. MANUAL TRANSMISSION

3. FOUR WHEEL DRIVE

[1] [2] [3]　　　　　[BACK]　　[HELP]

VIBRATION INFORMATION:

LISTED BELOW ARE EXAMPLES OF VIBRATIONS COMMONLY FOUND COMING FROM YOUR VEHICLE. TOUCH THE APPROPRIATE BOX OR BOXES THAT BEST DESCRIBES THE VIBRATIONS YOU ARE FEELING.

☐ SHAKING　　☐ [SHUDDER]
☐ THUMPING　☐ PULSATION
☐ TREMBLING　☐ MOAN
☐ BOOM　　　☐ ROUGHNESS
☐ BUZZING　　☐ TINGLING
☐ CLUNK　　　☐ RUMBLE
☐ CHATTER　　☐ SHIMMY
　　　　　　　☐ NONE OF THE ABOVE

[OK]　　[BACK]　　[HELP]

MANUAL TRANSMISSION:

TOUCH THE APPROPRIATE BOX OR BOXES THAT DESCRIBES THE SYMPYOM.

- ☐ DOESN'T GO INTO ANY GEAR
- ☐ CLUTCH SEEMS TO SLIP GOING INTO GEAR.
- ☐ CHATTERS GOING INTO GEAR.
- ☐ MAKES A GRINDING NOISE GOING INTO GEAR
- ☐ CLUTCH SEEMS HARD TO DEPRESS.
- ☐ CLUTCH SEEMS SOFT TO DEPRESS.
- ☐ CLUTCH PEDAL ENGAGES TO HIGH.
- ☐ CLUTCH PEDAL ENGAGES TOO LOW.
- ☐ POPS OUT OF GEAR.
- ☐ OIL OR FLUID LEAKING FROR TRANSMISSION.
- ☐ NONE OF THE ABOVE SYMPTOMS.

[OK]  [BACK]  [HELP]

Fig. 16B

AUTOMATIC TRANSMISSION:

TOUCH THE APPROPRIATE BOX OR BOXES THAT DESCRIBES THE SYMPTOM.

- ☐ DOESN'T SHIFT UP.
- ☐ DOESN'T SHIFT DOWN.
- ☐ DELAYS ENGAGEMENT IN FORWARD GEAR.
- ☐ DELAYS INGAGEMENT IN REVERSE GEAR.
- ☐ SHIFT IS ROUGH OR HARSH.
- ☐ SHIFT IS SLOW-SEEMS TO SLIP.
- ☐ SHIFT IS TOO EARLY.
- ☐ ENGINE RACES OR INCREASES RPM WHEN SHIFTING.
- ☐ TRANSMISSION MAKES UNUASAL NOISES.
- ☐ OIL OR FLUID LEAK COMING FROM TRANSMISSION.
- ☐ NONE OF THE ABOVE SYMPTOMS.

[OK]  [BACK]  [HELP]

WHEN DOES IT HAPPEN:

WHEN DO YOU NOTICE THE SYMPTOM(S). TOUCH THE APPROPRIATE BOX OR BOXES BELOW.

IN WHAT GEAR DOES THE SYMPTOM SHOW:

AUTOMATIC TRANSMISSION:
○ PARK  ○ REVERSE  ○ NEUTRAL
○ OD  ○ D  ○ 2  ○ 1  ● ANY GEAR.

MANUAL TRANSMISSION:
○ 1  ○ 2  ○ 3  ○ 4  ○ 5  ○ 6
○ NEUTRAL  ● ANY GEAR

THE SYSTEM SHOWS WHEN THE VEHICLE IS:
● ACCELERATING  ○ STANDING STILL  ○ BRAKING
○ TURNING  ○ SLOWING DOWN  ○ DRIVING UPHILL

THE SYMPTOM OCCURS WHEN I DRIVE FOR:
○ UNDER 5 MILES  ○ 5 TO 10 MILES
● OVER 10 MILES

MY VEHICLE'S ENGINE TEMPERATURE READS:
○ COLD  ● NORMAL  ○ HOT

[OK]  [BACK]  [HELP]

FOUR WHEEL DRIVE:

TOUCH THE APPROPRIATE BOX OR BOXES THAT DESCRIBES THE SYMPTOM.

DOESN'T SHIFT INTO 4WD HI

DOESN'T SHIFT INTO 4WD LOW.

MAKES A GRINDING NOISE GOING INTO 4WD.

4WD LIGHT DOESN'T COME ON.

4WD FRONT HUBS DON'T ENGAGE.

HARD TO TAKE OUT OF 4WD.

NONE OF THE ABOVE SYMPTOMS.

[OK]  [BACK]  [HELP]

*Fig. 16D*

HEATING SYSTEMS:

TOUCH THE APPROPRIATE BOX OR BOXES THAT DESCRIBES THE SYMPTOM.

☐ TEMPERATURE CONTROL SELECTOR IS HARD TO MOVE.
☐ VENT CONTROL SELECTOR IS HARD TO MOVE.
☐ DOESN'T DELIVER HOT AIR.
☐ TAKES TOO LONG TO DELIVER HOT AIR.
☐ DEFROST INOPERABLE OR FOGS UP.
☐ ENGINE TRMPERATURE GUAGE DOESN'T MOVE OFF OF COLD.
☐ UNUSUAL ODORS WHEN OPERATING.
☐ AIR DOESN'T FLOW FROM ALL OUTLETS PROPERLY.
☐ NONE OF THE ABOVE SYMPTOMS.

[ OK ]   [ BACK ]   [ HELP ]

*Fig. 17B*

HEATER / AIR CONDITIONING:

THE FOLLOWING QUESTIONS ARE DESIGNED TO DELIVER VALUABLE INFORMATION TO THE SERVICE TECHNICIAN WHO WILL WORK ON YOUR VEHICLE. PLEASE TOUCH THE APPROPRIATE NUMBER FOR YOUR VEHICLE'S SYMPTOM. PLEASE ONLY USE THE PEN PROVIDED TO YOU.

1. HEATING SYSTEM.
2. AIR CONDITIONING SYSTEM.
3. AUTO TEMPERATURE CONTROL SYSTEM.

[ 1 ]  [ 2 ]  [ 3 ]   [ BACK ]   [ HELP ]

*Fig. 17A*

AUTOMATIC TEMPERATURE CONTROL SYSTEM:

TOUCH THE APPROPRIATE BOX OR BOXES THAT DESCRIBES THE SYMPTOM.

☐ TEMPERATURE READING IS INACCURATE.
☐ BUTTONS ON THE CONTROL UNIT ARE INOPERABLE.
☐ TAKES TOO LONG TO DELIVER ACCURATE TEMPERATURE.
☐ NONE OF THE ABOVE SYMPTOMS.

[OK]  [BACK]  [HELP]

*Fig. 17D*

AIR CONDITIONING SYSTEMS:

TOUCH THE APPROPRIATE BOX OR BOXES THAT DESCRIBES THE SYMPTOM.

☐ TEMPERATURE CONTROL SELECTOR IS HARD TO MOVE.
☐ VENT CONTROL SELECTOR IS HARD TO MOVE.
☐ DOESN'T DELIVER COLD AIR.
☐ TAKES TOO LONG TO DELIVER COLD AIR.
☐ TEMPERATURE CHANGES UNEXPECTEDLY.
☐ UNUSUAL ODORS WHEN OPERATING.
☐ DOESN'T FLOW FROM ALL OUTLETS PROPERLY.
☐ A/C COMPRESSOR SEEMS TO CYCLE TOO OFTEN.
☐ NONE OF THE ABOVE SYMPTOMS.

[OK]  [BACK]  [HELP]

*Fig. 17C*

WHEN DOES IT HAPPEN:

WHEN DO YOU NOTICE THE SYMPTOM(S).
TOUCH THE APPROPRIATE BOX OR BOXES BELOW.

WHEN THE SELECTOR CONTROL IS:
○ FLOOR  ○ MIX  ○ VENT  ○ DEFROST
● DOESN'T MATTER

WHEN THE TEMPERATURE CONTROL IS:
○ COOL  ○ WARM  ○ NORMAL A/C  ○ MAX A/C
○ DEFROST  ● DOESN'T MATTER

WHEN I AM MOVING THE SELECTOR OR CHANGING THE TEMPERATURE:
○ YES  ● NO

WHEN THE VEHICLE IS:
○ STOPPED  ○ ACCELERATING FROM STOP
○ MOVING  ○ DECELERATING  ● DOESN'T MATTER

WHEN THE VEHICLE TEMPETATURE IS:
○ COLD  ○ NORMAL  ○ HOT  ● DOESN'T MATTER

[OK]  [BACK]  [HELP]

*Fig. 17E*

CONVENTIONAL BRAKE SYSTEM

TOUCH THE APPROPRIATE BOX OR BOXES THAT BEST DESCRIBES WHAT YOU ARE NOTICING.

☐ BRAKE PEDAL SEEMS TO PULSATE.
☐ PULLS RIGHT OR LEFT WHEN STOPPING.
☐ GRINDING NOISE WHEN STOPPING.
☐ SQUEAKS WHEN STOPPING.
☐ BRAKE PEDAL FADES (GOES TO THE FLOOR)
☐ BRAKE PEDAL SEEMS LOW.
☐ BRAKING EFFORT SEEMS EXCESSIVE.
☐ BRAKE LIGHT ON.
☐ NONE OF THE ABOVE SYMPTOMS.

[OK]   [BACK]   [HELP]

*Fig. 18B*

BRAKE SYSTEM:

THE FOLLOWING QUESTIONS ARE DESIGNED TO DELIVER VALUABLE INFORMATION TO THE SERVICE TECHNICIAN WHO WILL WORK ON YOUR VEHICLE. PLEASE TOUCH THE APPROPRIATE NUMBER FOR YOUR VEHICLE'S SYMPTOMS.

1. CONVENTIONAL BRAKE SYSTEM.
2. ANTI LOCK BRAKE SYSTEM.
3. BOTH SYSTEMS.

[1] [2] [3]   [BACK]   [HELP]

WHEN DOES IT HAPPEN:

WHEN DO YOU NOTICE THE SYMPTOM(S). PLEASE ANSWER THE QUESTIONS BY TOUCHING THE APPROPRIATE BOX OR BOXES WITH THE PROVIDED PEN.

WHEN I BRAKE UNDER THE FOLLOWING CONDITIONS:

- ● NORMAL BRAKING ON DRY PAVED ROADS.
- ○ PANIC STOP (BRAKING HARD) ON DRY PAVED ROADES.
- ○ AT HIGH SPEEDS (ABOVE 55 MPH).
- ○ AT LOW SPEEDS.

WHEN MY VEHICLE'S ENGINE TEMRERATURE READS:

○ COLD  ● NORMAL  ○ HOT

[OK]  [BACK]  [HELP]

Fig. 18C

ANTI-LOCK BRAKING SYSTEM:

TOUCH THE APPROPRIATE BOX OR BOXES THAT DESCRIBES WHAT YOU ARE NOTICING.

- ☐ ANTI-LOCK BRAKES SEEM INOPERABLE.
- ☐ ANTI-LOCK BRAKE LIGHT IS ON CONSTANTLY.
- ☐ ANTI-LOCK BRAKE LIGHT IS ON INTERMITTENLY.
- ☐ NONE OF THE ABOVE.

[OK]  [BACK]  [HELP]

STEERING AND SUSPENSION:

THE FOLLOWING QUESTIONS ARE DESIGNED TO DELIVER VALUABLE INFORMATION TO THE SERVICE TECHNICIAN WHO WILL WORK ON YOUR VEHICLE. PLEASE TOUCH THE APPROPRIATE NUMBER FOR YOUR VEHICLE'S SYMPTOM. PLEASE ONLY USE THE PEN PROVIDED TO YOU.

1. STEERING
2. SUSPENSION

[1] [2]  [BACK]  [HELP]

*Fig. 19A*

STEERING INFORMATION:

TOUCH THE APPROPRIATE BOX OR BOXES THAT DESCRIBES THE SYMPTOM.

☐ STEERING WHEEL SHAKES WHILE DRIVING.
☐ VEHICLE PULLS RIGHT WHILE DRIVING.
☐ VEHICLE PULLS LEFT WHILE DRIVING.
☐ VEHICLE WANDERS LEFT OR RIGHT WHILE DRIVING.
☐ STEERING WHEEL IS OFF-CENTER.
☐ TIRES ARE WEARING ABNORMALLY.
☐ STEERING WHEEL SEEMS HARD TO TURN.
☐ POWER STEERING MAKES ABNORMAL NOISES.
☐ NONE IF THE ABOVE SYMPTOMS.

[OK]  [BACK]  [HELP]

*Fig. 19B*

SUSPENSION INFORMATION:

TOUCH THE APPROPRIATE BOX OR BOXES THAT DESCRIBES THE SYMPTOM.

☐ FRONT END BOUNCES EXCESSIVELY WHILE DRIVING.
☐ REAR END BOUNCES EXCESSIVELY WHILE DRIVING.
☐ RIGHT FRONT SEEMS TO SAG.
☐ LEFT FRONT SEEMS TO SAG.
☐ RIGHT REAR SEEMS TO SAG.
☐ LEFT REAR SEEMS TO SAG.
☐ SUSPENSION NOISE OVER BUMPS.
☐ SUSPENSION SEEMS TOO SOFT.
☐ AUTO RIDE CONTROL LIGHT COMES ON.
☐ NONE OF THE ABOVE SYMPTOMS.

[OK] [BACK] [HELP]

WHEN DOES IT HAPPEN:

WHEN DO YOU NOTICE THE SYMPTOM(S). TOUCH THE APPROPRIATE BOX OR BOXES BELOW.

WHEN THE VEHICLE IS:
○ ACCELERATING  ○ SLOWING DOWN OR STOPPING
○ TURNING  ○ TURNING ON PAVED ROADS
○ TURNING ON DIRT OR ROUGH ROADS
● DOESN'T MATTER

WHEN THE VEHICLES SPEED IS:
○ NOT MOVING  ○ 0 TO 10 MPH
○ 10 TO 35 MPH  ○ 35 TO 50 MPH
○ OVER 55 MPH

[OK] [BACK] [HELP]

*Fig. 19D*

ELECTRICAL INFORMATION:
THE FOLLOWING QUESTIONS ARE DESIGNED TO DELIVER VALUABLE INFORMATION TO THE SERVICE TECHNICIAN WHO WILL WORK ON YOUR VEHICLE. PLEASE TOUCH THE APPROPRIATE NUMBER FOR YOUR VEHICLE'S SYMPTOM. PLEASE ONLY USE THE PEN PROVIDED TO YOU.

1. ELECTRICALLY OPERATED COMPONENTS.
1. POWER ACCESSORIES.

[1] [2]   [BACK] [HELP]

*Fig. 20A*

ELECTRICALLY OPERATED COMPONENTS:
TOUCH THE APPROPRIATE BOX OR BOXES THAT BEST DESCRIBE THE AREA OF THE SYMPTOM.

☐ EXTERIOR LIGHT(S).
☐ INTERIOR LIGHT(S)
☐ WARNING GUAGES OR LIGHTS.
☐ HORN OR CIGAR LIGHTER / POWER SOCKET.
☐ WINDSHIELD WIPERS / WASHERS.
☐ REAR WINDOW DEFROSTER

IF THE ABOVE DOESN'T SEEM TO DESCRIBE THE PROBLEM, TOUCH "BACK" THEN SELECT "POWER ACCESSORIES" AND LOOK THERE FOR A BETTER DESCRIPTION.

[OK]   [BACK] [HELP]

LETS NARROW THE SEARCH:

TOUCH THE APPROPRIATE BOX OR BOXES THAT DESCRIBES THE PROBLEM.

☐ SCRATCHED ☐ OUT OF ADJUSTMENT
☐ MISSING ☐ BROKEN
☐ LEAKS AIR ☐ CRACKED
☐ LEAKS WATER ☐ WARPED
☐ TORN ☐ LOOSE
☐ BLEMISHED ☐ COLOR FADES
☐ LIFT MECHANISM ☐ PEELING
☐ FOLD MECHANISM ☐ PITTED
☐ WON'T LOCK / UNLOCK ☐ DOESN'T WORK

☐ NONE OF THE ABOVE

[OK]  [BACK]  [HELP]

Fig. 20C

POWER ACCESSORIES INFORMATION:

TOUCH THE APPROPRIATE BOX OR BOXES THAT DESCRIBES THE SYMPTOM.

☐ KEYLESS ENTRY / ALARM SYSTEM.
☐ LIGHTED MIRRORS / POWER MIRRORS.
☐ AUTO DIM HEADLAMPS / INTERIOR LIGHTING.
☐ POWER SEAT ADJUSTMENT/ COMFORT.
☐ AUDIO SYSTEMS / POWER ANTENNA.
☐ POWER WINDOWS / LOCKS / SUNROOF.
☐ CRUSE CONTROL.

IF THE ABOVE DOESN'T SEEM TO DESCRIBE THE PROBLEM, TOUCH "BACK" THEN SELECT "ELECTRICALLY OPERATED COMPONENTS" AND LOOK THERE FOR A BETTER DESCRIPTION.

[OK]  [BACK]  [HELP]

SCHEDULED MAINTENANCE:

YOUR VEHICLE'S CLOSEST SCHEDULED MAINTENANCE SERVICE HAS BEEN HIGHLIGHTED BELOW. PLEASE CHOOSE THE SERVICE YOU WISH TO HAVE PERFORMED BY TOUCHING THE APPROPRIATE MILAGE. REFER TO YOUR MAINTENANCE SCHEDULE BOOKLET TO VIEW THE ITEMS PERFORMED IN THE SERVICE. IF YOU WISH TO CHANGE ANY PART OF THE SERVICE, SELECT HELP THEN #3

YOR ENTERED MILAGE IS: 12,500

- ● 12,000 MILES         ○ 18,000 MILES
- ○ 6,000 MILES          ○ 24,000 MILES

[OK]   [BACK]   [HELP]

*Fig. 21B*

OTHER SERVICES AVAILABLE:

PLEASE SELECT THE CATEGORY OF THE PROBLEM YOU ARE OBSERVING WITH YOUR VEHICLE.

1. SCHEDULED MAINTENANCE.
2. UNSCHEDULED MAINTENANCE:
3. VEHICLE EXTERIOR.
4. VEHICLE INTERIOR.
5. SPECIAL ORDER PARTS/ RECALL NOTICE.
6. NEW OR USED CAR INTERNAL.
7. GENERAL PROBLEMS.

[1] [2] [3] [4] [5] [6] [7]

[BACK]   [HELP]

*Fig. 21A*

VEHICLE EXTERIOR:

THIS SECTION INCLUDES THE VEHICLE'S BODY AND RELATED EXTERIOR PARTS. PLEASE TOUCH THE APPROPRIATE AREA IN WHICH THE PROBLEM IS OCCURRING.

○ BODY PANELS FIT AND FINISH.
○ EXTERIOR SEALS (DOORS, SUNROOF, TRUNK, ETC.)
○ PLASTIC TRIM AND MOLDINGS.
○ EXTERIOR MIRRORS, HANDLES, LOCKS AND BUTTONS.
○ WHEELS OR SPARE WHEEL CARRIERS.
○ PAINT AND / OR CLEARCOAT.
○ REMOVEABLE HARDTOP / SOFT TOP CONVERTABLE.
○ WINDSHIELD OR WINDOWS.
● EXTERIOR LIGHTS OR LIGHT COVERS.

[OK]  [BACK]  [HELP]

UNSCHEDULED MAINTENANCE:

TOUCH THE BOX OR BOXES NEXT TO THE APPROPRIATE SERVICES YOU WOULD LIKE PERFORMED. PLEASE REFER TO YOUR VEHICLE'S MAINTENANCE SCHEDULE BOOKLET FOR MORE INFORMATION OF THE SERVICES BELOW. OR YOU CAN REQUEST A MAINTENANCE SHEET FROM ONE OF THE ASSISTANTS ON THE SERVICE AISLE.

☐ EVERY 3000 MILES:           $ 35.00
☐ EVERY 6000 MILES:           $ 55.00
☐ EVERY 15,000 MILES:         $ 85.00
☐ EVERY 30,000 MILES:         $100.00
☐ EVERY 60,000 MILES:         $125.00
☐ VEHICLE ALIGNMENT, 2 WHEEL: $ 35.00
☐ VEHICLE ALIGNMENT, 4 WHEEL: $ 75.00
☐ VEHICLE INSPECTION:         $ 35.00

[OK]  [BACK]  [HELP]

*Fig. 21C*

PROBLEM LOCATION:

TO HELP NARROW THE SEARCH, TOUCH THE WORD OR WORDS THAT BEST DESCRIBE WHERE THE PROBLEM IS LOCATED.

INTERIOR LOCATIONS:
- ● INTERIOR LIGHT.
- ○ INTERIOR INSTRUMENT LIGHT.

[ OK ]   [ BACK ]   [ HELP ]

VEHICLE INTERIOR:

THIS SECTION INCLUDES THE VEHICLE'S INTERIOR AND TRUNK AREA. PLEASE TOUCH THE APPROPRIATE NUMBER IN WHICH THE PROBLEM IS OCCURRING.

- ○ SEATS OR SEAT CUSHIONS.
- ○ CARPETING OR FLOOR MATS.
- ○ DOOR PANELS OR INTERIOR SIDE PANELS.
- ○ INTERIOR TRIM OR HEADLINER.
- ○ DASH PANEL OR INSTRUMENT PANEL.
- ○ INTERIOR KNOBS, HANDLES AND LATCHES.
- ○ INTERIOR SWITCHES, BUTTONS, LOCKS AND SLIDES.
- ○ WINDSHIELD OR WINDOWS.
- ● INTERIOR LIGHTING, INSTRUMENT PANEL LIGHTING.

[ OK ]   [ BACK ]   [ HELP ]

*Fig. 21G*

PROBLEM DESCRIPTION:
TOUCH THE BOX OR BOXES NEXT TO THE WORD OR PHRASE THAT BEST DESCRIBES THE PROBLEM.

☐ SCRATCHED ☐ OUT OF ADJUSTMENT
☐ MISSING ☐ BROKEN
☐ LEAKS AIR ☐ CRACKED
☐ LEAKS WATER ☐ WARPED
☐ TORN ☐ LOOSE
☐ BLEMISHED ☐ COLOR FADES
☐ LIFT MECHANISM ☐ PEELING
☐ FOLD MECHANISM ☐ PITTED
☐ WONT LOCK / UNLOCK ☐ DOESN'T WORK

☐ NONE OF THE ABOVE

[ OK ]   [ BACK ]   [ HELP ]

*Fig. 21J*

VEHICLE INTERIOR:
TOUCH THE LOCATION ON THE GRAPHIC BELOW TO SHOW THE LOCATION OF THE PROBLEM.

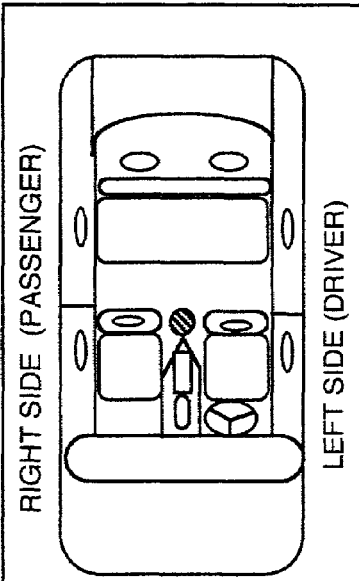

RIGHT SIDE (PASSENGER)
LEFT SIDE (DRIVER)
[ CLEAR DOT ]

[ OK ]   [ BACK ]   [ HELP ]

*Fig. 21I*

THINGS YOU SEE:

TOUCH THE BOX NEXT TO THE WORD OR PHRASE THAT BEST DESCRIBE THE PROBLEM.

☐ SCRATCHED    ☐ OUT OF ADJUSTMENT
☐ MISSING      ☐ BROKEN
☐ LEAKS AIR    ☐ CRACKED
☐ LEAKS WATER  ☐ WARPED
☐ TORN         ☐ LOOSE
☐ BLEMISHED    ☐ COLOR FADES
☐ LIFT MECHANISM  ☐ PEELING
☐ FOLD MECHANISM  ☐ PITTED
☐ WON'T LOCK / UNLOCK  ☐ DOESN'T WORK

☐ NONE OF THE ABOVE

[OK]    [BACK]    [HELP]

THIS SECTION OFFERS YOU A GENERAL DESCRIPTION OF THE VEHICLE'S PROBLEM AND PROVIDES THE TECHNICIAN WITH VITAL INFORMATION TO BEGIN A SUCCESSFUL REPAIR. IF YOU CAN'T FIND YOUR VEHICLE'S SYMPTOM IN THE MAIN MENU, PROCEED TO THE NEXT SCREEN BY TOUCHING OK BELOW, OR SEE YOUR SERVICE ADVISOR.

THERE ARE FOUR MAIN SENSES YOU HAVE THAT INDICATE A PROBLEM WITH YOUR VEHICLE. PLEASE CHOOSE THE MOST APPROPRIATE SENSE BELOW.

1. THINGS YOU SEE.
2. THINGS YOU HEAR.
3. THINGS YOU SMELL.
4. THINGS YOU FEEL.

[1] [2] [3] [4]    [BACK]    [HELP]

THINGS YOU SMELL:

TOUCH THE BOX NEXT TO THE WORD OR PHRASE THAT BEST DESCRIBE THE PROBLEM.

- ☐ BURNING SMELL
- ☐ MUSTY ODOR
- ☐ RAW FUEL SMELL
- ☐ ROTTEN-EGG SMELL
- ☐ EXHAUST LEAK
- ☐ ENGINE COOLANT SMELL
- ☐ BURNING BRAKE SMELL
- ☐ BURNING CLUTCH SMELL
- ☐ BURNING RUBBER SMELL
- ☐ NONE OF THE ABOVE SYMPTOMS.

[OK]  [BACK]  [HELP]

Fig. 21O

THINGS YOU HEAR:

TOUCH THE BOX NEXT TO THE WORD OR PHRASE THAT BEST DESCRIBE THE PROBLEM.

- ☐ SQUEAK
- ☐ RATTLE
- ☐ WHISTLE
- ☐ HUM
- ☐ BUZZ
- ☐ CHIRP
- ☐ SQUEAL
- ☐ CLUNK
- ☐ TAP
- ☐ CLICK GRIND
- ☐ GROWL
- ☐ KNOCK
- ☐ METAL CLANG
- ☐ RUMBLE
- ☐ NONE OF THE ABOVE

[OK]  [BACK]  [HELP]

WHEN DOES IT HAPPEN:

WHEN DO YOU NOTICE THE SYMPTOMS ?
TOUCH THE APPROPRIATE BOX OR BOXES.

WHEN THE VEHICLE IS:
○ ACCELERATING  ○ SLOWING DOWN OR STOPPING
○ TURNING ON PAVED ROADS
○ TURNING ON DIRT ROADS
◉ DOESN'T MATTER

WHEN THE VEHICLES SPEED IS:
◉ NOT MOVING   ○ 0 TO 10 MPH
○ 10 TO 35 MPH  ○ 35 TO 50 MPH
○ OVER 55 MPH

[OK]   [BACK]   [HELP]

*Fig. 21R*

THINGS YOU FEEL:

LISTED BELOW ARE EXAMPLES OF VIBRATIONS COMMONLY FOUND COMING FROM YOUR VEHICLE. TOUCH THE APPROPRIATE BOX OR BOXES THAT BEST DESCRIBE THE VIBRATION(S) YOU ARE FEELING.

☐ SHAKING       ☐ SHUDDER
☐ THUMPING      ☐ PULSATION
☐ TREMBLING     ☐ MOAN
☐ BOOM          ☐ ROUGHNESS
☐ BUZZING       ☐ TINGLING
☐ CLUNK         ☐ RUMBLE
☐ CHATTER       ☐ SHIMMY
                ☐ NONE OF THE ABOVE

[OK]   [BACK]   [HELP]

*Fig. 21Q*

WHERE IS IT COMING FROM:

PLEASE INDICATE THE APPROPRIATE AREA THE NOISE AND/OR VIBRATION SEEMS TO COME FROM. TOUCH THE LOCATION OF THE PROBLEM ON THE APPROPRIATE ILLUSTRATION.

INSIDE THE VEHICLE

RIGHT SIDE (PASSENGER)
LEFT SIDE (DRIVER)

UNDER THE VEHICLE

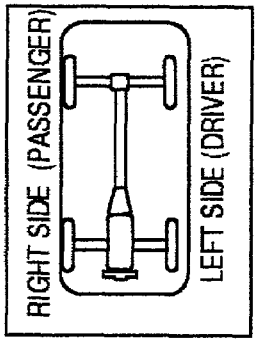

RIGHT SIDE (PASSENGER)
LEFT SIDE (DRIVER)

CLEAR DOT

ON THE DASH

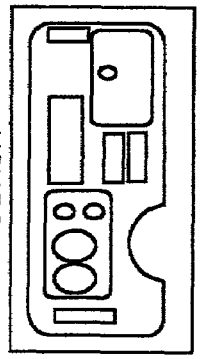

CLEAR DOT

[OK] [BACK] [HELP]

*Fig. 21S*

GENERAL QUESTIONS:

AT JACK'S BMW WE ARE COMMITTED TO GIVING TO YOU THE BEST POSSIBLE SERVICE AND CORRECT REPAIR THE FIRST TIME. PLEASE HELP US BY ANSWERING THE FOLLOWING QUESTIONS. TOUCH THE APPROPRIATE BOX FOR EACH QUESTION.

[OK] [BACK] [HELP]

OTHER SYMPTOMS:

PLEASE TELL US ABOUT THE SYMPTOMS.

HOW OFTEN DOES THE SYMPTOM SHOW UP:
◉ ALWAYS  ○ SOMETIMES  ○ RARELY

WHEN DID THE PROBLEM BEGIN:
○ AFTER LAST REPAIR  ◉ JUST STARTED
○ A FEW DAYS AGO  ○ MORE THAN A WEEK
○ A FEW WEEKS  ○ MORE THAN A MONTH AGO

HAS THE PROBLEM BEEN WORKED ON BEFOFE:
○ YES  ◉ NO

WHEN THE PROBLEM OCCURES, THE WEATHER IS:
○ HOT  ○ HUMID OR RAINY  ○ COOL
○ FREEZING COLD  ◉ DOESN'T MATTER

[OK]  [BACK]  [HELP]

Fig. 22C

RETURN PROBLEM:

WHEN DO YOU NOTICE THE SYMPTOMS? TOUCH THE APPROPRIATE BOX OR BOXES.

HOW MANY TIMES HAS THE PROBLEM BEEN WORKED ON:
◉ ONCE  ○ TWICE  ○ THREE TIMES AND OVER

APPROXIMATELY HOW LONG AGO:
◉ A FEW DAYS AGO  ○ A WEEK TO TWO WEEKS
○ A FEW WEEKS  ○ MONTH AGO

HAS THE PROBLEM BEEN LOOKED AT BY ANYONE OTHER THAN THIS SERVICES DEPARTMENT:
○ YES  ◉ NO

[OK]  [BACK]  [HELP]

UNSCHEDULED SERVICES:

WOULD YOU LIKE ANY OF THE FOLLOWING
UNSCHEDULED SERVICES TO BE PERFORMED.

☐ COMPUTERIZED VEHICLE ALIGNMENT          $ 95.00
   (EXTENDS TIRE LIFE, IMPROVES HANDLING)

☐ LUBE, OIL AND FILTER CHANGE              $ 45.00
   (EXTENDES THE LIFE OF THE ENGINE
   AND SUSPENSION PARTS)

☐ MINOR TUNE-UP                            $ 50.00
   (IMPROVES FEUL MILAGE AND GIVES
   QUICKER STARTS)

☐ VEHICLE DETAIL AND WASH                  $25.00
   (IMPROVES YOUR VEHICLES APPEARANCE)

[OK]   [BACK]   [HELP]

ADDITIONAL PROBLEMS:

DO YOU HAVE ANY ADDITIONAL VEHICLE PROBLEMS
OR MAINTENANCE REQUIREMENTS YOU WOULD
LIKE TO HAVE ADDRESSED TODAY.

[ADD SYMPTOM]

[DONE]   [BACK]

*Fig. 23*

VEHICLE ESTIMATE AND PICK-UP TIME:

YOUR PERSONAL SERVICE ADVISOR IS: _____
HE OR SHE WILL CONTACT YOU AND PROVIDE YOU WITH ANY ESTIMATED REPAIR COSTS AND PICK-UP TIME FOR YOUR VEHICLE. IF YOU PREFER AN APPROXIMATE COST AND PICK-UP TIME NOW, SEE YOUR SERVICE ADVISOR AFTER COMPLETING YOUR REPAIR ORDER. PLEASE CHOOSE YOUR OPTION BELOW.

⦿ PLEASE CONTACT ME
○ I WOULD LIKE TO SEE THE ADVISOR.

[OK]  [BACK]  [HELP]

ESTIMATED REPAIR COSTS:

THE ESTIMATED MAINTENANCE COST IS AS FOLLOWS:

TOTAL:  $ 0.00

PLEASE KEEP IN MIND THE ACTUAL COSTS MAY BE HIGHER OR LOWER THAN THE ESTIMATE. WE WILL CONTACT YOU IF THE COST OF THE REPAIR IS HIGHER THAN THE ESTIMATE.

[OK]  [BACK]  [HELP]

*Fig. 26*

WAIT/ DROP OFF / LOANER SCREEN:

PLEASE ANSWER THE FOLLOWING QUESTIONS SO WE CAN PREPARE FOR YOU.

ARE YOU WAITING FOR YOUR VEHICLE:
○ YES  ● NO

WOULD YOU LIKE A LOANER VEHICLE:
○ YES  ● NO

WOULD YOU LIKE TO RECEIVE THE REPLACED PARTS:
○ YES  ● NO

[OK]  [BACK]  [HELP]

*Fig. 30*

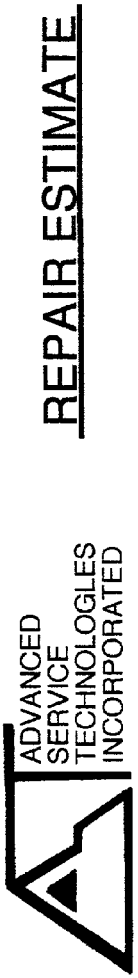

REPAIR ESTIMATE

ADVANCED SERVICE TECHNOLOGIES INCORPORATED

CONTROL NO. 553
DATE: 7/13/98
TIME: 7:54:15 PM

VEHICLE: DESCRIPTION: *DODGE RAM 350/FORREST GREEN/2001* MILEAGE: 33225 VIN: 123456789 PLATE: BRT-1234

CUSTOMER: NAME: *JOHN DOE* PHONE #1: (303)333-4444 PHONE #2: (303)333-4445
ADDRESS: *1234 HIS WAY ST.* CITY/ST/ZIP: ANYTOWN, USA 12345

ANTI-LOCK BRAKE SYSTEM
ANTI-LOCK BRAKE LIGHT IS ON CONSTANTLY.
ANTI-LOCK BRAKE LIGHT IS ON INTERMITTENTLY.
WHEN I BRAKE UNDER THE FOLLOWING CONDITIONS: NORMAL BRAKING ON DRY PAVED ROADS.
WHEN MY VEHICLE'S ENGINE TEMPERATURE READS: NORMAL
HOW OFTEN DOES THE SYMPTOM SHOW UP: ALWAYS
WHEN DID THE PROBLEM BEGIN: JUST STARTED
SHOW MANY TIMES HAS THE PROBLEM BEEN WORKED ON: THREE TIMES AND OVER
APPROXIMATELY HOW LONG AGO: A FEW DAYS AGO

ELECRTICALLY OPERATED COMPONENTS
INTERIOR LIGHT(S)
WARNING GUAGES OR LIGHTS.
HORN OR CIGAR LIGHTER / POWER SOCKET.
WHAT DID YOU NOTICE: CRACKED
WHAT DID YOU NOTICE: WARPED
WHAT DID YOU NOTICE: LOOSE
WHEN I START THE VEHICLE.
WHEN I TRY TO SET THE CONTROL.
WHEN I OPEN A DRIVER-SIDE DOOR.
WHEN I TURN THE HEAD LIGHTS ON.
SECTION C3 WAS CHOSEN FOR THE ELECTRICAL PROBLEM LOCATION.
HOW OFTEN DOES THE SYMPTOM SHOW UP: ALWAYS
WHEN DID THE PROBLEM BEGIN: JUST STARTED
HOW MANY TIMES HAS THE PROBLEM BEEN WORKED ON: THREE TIMES AND OVER
APPROXIMATELY HOW LONG AGO: A WEEK TO TWO WEEKS (CONTINUED ON FIG. 32B)

*Fig. 32A*

(CONTINUED FROM FIG. 32A)

STEERING SYSTEM

VEHICLE PULLS RIGHT WHILE DRIVING.
VEHICLE PULLS LEFT WHILE DRIVING
VEHICLE WANDERS LEFT OR RIGHT WHILE DRIVING.

TOTAL PARTS: _____ TOTAL LABOR: _____ MATERIALS COST _____ TAX _____ GRAND TOTAL _____

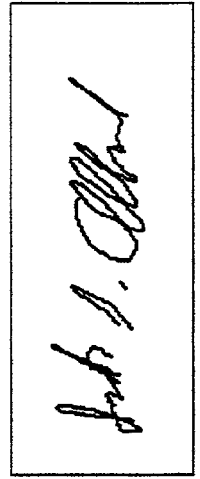

SIGNATURE:

AUTHORIZATION: I AUTHORIZE THE ABOVE WORK TO BE PREFORMED AND AGREE TO THE TERMS OF THIS REPAIR ORDER. FURTHERMORE, I RELEASE ANY AND ALL LIABILITY TO RPM ENTERPRISES, INC. ON THE ABOVE VEHICLE INCLUDING, BUT NOT LIMITED TO: DAMAGE, THEFT, FAILURE OF RELATED REPAIR ITEMS, AND EXPRESSED OR IMPLIED WARRENTY OF ALL INSTALLED PARTS.

*Fig. 32B*

INTERACTIVE SYMPTOMATIC RECORDING SYSTEM AND METHOD UTILIZING SYMPTOMATIC MEMORY

CROSS-REFERENCE TO RELATED APPLICATION

This application is a continuation in part of U.S. patent application Ser. No. 09/122,404 filed Jul. 25 1998 now U.S. Pat. No. 6,311,162 and of U.S. patent application Ser. No. 09/880,973 filed Jun. 14, 2001 now abandoned which patent application Ser. No. 09/880,973 is a continuation of application Ser. No. 09/122,404.

BACKGROUND OF THE INVENTION

1. Field of the Invention

This invention relates to interactive computerized systems and methods for obtaining and processing information. More particularly, the invention pertains to an interactive system and method for receiving information regarding a customer, equipment such as an automobile, a tractor and/or trailer, a fork lift, cherry picker or front loader, and symptomatic problems that prompt the need for service or repair of the equipment, and the processing of the symptomatic information to generate equipment work and parts orders for the customer, for parts suppliers, and for service personnel. The invention further pertains to the transmission of work completion data to accounting and/or quality control subsystems. While the invention is usable for servicing a variety of equipment, it will be primarily described here in terms of automobiles because the description of this example addresses most, if not all, of the problems relative to a large repair shop for such equipment.

2. Description of the Related Art

Dropping off equipment at a dealership or service site for service can be a time consuming and frustrating activity. Even through such organizations may open as early as 7 a.m. and stay open until 6 p.m. or so in order to accept equipment for service, these hours are not always long enough to accommodate all customers. Consequently, some customers find it necessary to drop off their equipment off during hours that the service centers are closed. With automobiles, for example, the driver usually leaves the automobile keys in an envelope upon which the driver writes observed problems, and requests service of these problems. The envelope is usually then put into a cubicle, which locks on closure. In such instances, the symptom situation is not always communicated effectively. Even when the repair shop is open, the customer may need to wait some time in order to provide the necessary information to a service manager or other representative, thus creating further delays. The above process is improved by using the modern computer technology of this invention.

The present invention provides an interactive, user friendly, symptomatic recording system for the driver or other equipment operator, i.e. the customer. The customer can answer basic menu-driven queries and/or prompts, and the system prepares and transmits to the repair center a preliminary symptomatic report including the symptom or symptoms that prompted the need for repair or service, including the frequency of occurrence of the problem symptoms. For example, problems could be hard starting in the cold, which problem has never happened before. The system of the invention is particularly useful for use outside of the normal operating hours of the repair facility.

Representative of the art is;

U.S. Pat. No. 5,214,582, issued to Gray, teaches interactive diagnostic systems and methods for automotive vehicles of the type having networks of sensors and actuators for sensing and actuating various functions in the vehicle and onboard computers for monitoring sensors and controlling the actuators. An external computer is used to control selected actuators independent of the onboard computer and for simulating operation of selected sensors. At the same time, the electronic data entering and existing the onboard computer is monitored and analyzed by the external computer for trouble shooting purposes.

U.S. Pat. No. 5,513,107, issued to Gormley of Ford Motor Co., teaches methods and apparatus for controlling operating subsystems of motor vehicles. Diagnostic maintenance services for the vehicles are provided by monitoring various operating subsystems connected to a vehicle controller and recording diagnostic data. Such data can be periodically communicated to a service center which determines the service(s) needed and communicates their conclusions back to the vehicle controller where it is displayed to the vehicle operator.

U.S. Pat. No. 5,557,268, issued to Hughes et al. of Exxon, teaches an automatic vehicle recognition and customer automobile diagnostic system. Each vehicle includes a transponder that transmits a Radio Frequence (RF) code so that vehicle diagnostic measurements made upon entry to the service facility can be associated with the specific vehicle and displayed to the customer in their service area.

U.S. Pat. No. 5,058,044, issued to Stewart et al., teaches a system for automatically identifying vehicles assimilating data from the identified vehicle, correlating the data with predetermined data and providing a statement of account for a transaction involving the vehicle. A service record for the vehicle is prepared by the system for use in connection with such transactions. Data for the service record is provided primarily by onboard sensors, but may be augmented by data submitted via an onboard keyboard.

U.S. Pat. No. 4,602,127, issued to Neely et al., teaches a vehicle diagnostic system comprising a portable communications control station and a remote data processing station. A portable communications controller is connected to a vehicle data terminal to obtain data from the vehicle's onboard computer.

U.S. Pat. No. 4,975,847 and 5,065,023 both issued to Abe et al., teach motor vehicle diagnosis systems.

U.S. Pat. No. 5,541,840, issued to Gurne et al. of Chrysler Corporation, teaches a hand-held automotive diagnostic service tool which can operate with a matter station to monitor, display, and process vehicle data and diagnose fault conditions. Service manual pages can be displayed and parts ordered on-line.

U.S. Pat. No. 5,533,093 teaches an automated troubleshooting mechanism incorporated into portable test and communications equipment for telephone lines. Work order manager software is employed.

U.S. Pat. No. 4,916,441 teaches a hand-held pocket terminal having a display screen and bar code reader for use in conjunction with patient medical care.

Various aspects of interactive CRT touch panel displays are taught by U.S. Pat. Nos. 4,449,186 (to Kelly et al.), 5,404,443 (to Hirata), 5,488,575 (to Danielson et al.), 5,499, 707 (to Steuryl) 1 5,537,315 (to Mitcham) and 5,539,429 (to Yano et al.). Such touch panels have been found useful in facilitating communications in a variety of customer service contexts.

The Super Advisor System marketed by Automatic Data Processing, Inc., of Hoffman Estates, Ill., USA, allows Service advisors to use a hand-held, wireless pen pad computer system to select or decline maintenance items displayed on the computer's screen and to describe vehicular problems via a series of checklists and multiple choice questions. The system also provides customer appointment management, etc., using Microsoft Windows.

SUMMARY OF THE INVENTION

One aspect of the preset equipment serving invention is to provide an efficient system and process for obtaining, recording and utilizing appropriate information about a vehicle, and why it requires service from a customer, this system including use of the Internet.

In an embodiment of the invention the Internet provides for communication between a plurality of service sites and a plurality of equipment sites at which equipment needing maintenance, repair, periodic service and/or emergency service are operated. Each piece of equipment includes a sensor array and a manual actuator that is activated when an abnormal mode of operation of the equipment is experienced. When the manual actuator on a piece of equipment is actuated, the equipment's operating conditions, as sensed by the sensor array, are stored in memory. Later, when a request to service the equipment is sent from an equipment site to a service site, using the Internet, the service site queries the equipment site as to equipment symptoms. Upon receiving this query, an operator at the equipment site causes the symptoms stored in memory to be transmitted to the service site, again using the Internet. Based upon the symptoms received at the service site, a service plan for the equipment is formulated.

The invention provides a system for obtaining such symptom information without the need for the presence of a representative of the repair shop.

Yet another aspect of the invention is to provide a complete, concise, and readable repair/service order for the mechanics, for part suppliers, and for the customer.

These and other objectives are fulfilled by a preprogrammed and interactive computer systems for obtaining vehicle information, problem symptoms and a request for service from a customer, and for developing work orders and parts orders based upon the information that was supplied by the customer. The system includes:

Interactive input, display, computing and storage mechanisms for querying the customer, for receiving inputs of information from the customer, and for storing the provided information;

A preprogrammed central computer processing unit(s) for ordering successive presentations of appropriate queries for presentation to the customer via the display means;

A compiler to summarize inputs received from the customer, and for processing a summary of a work order and/or a parts order, and at least one printer to print a work order for use by both the customer and a mechanic, to process billing records, and to process reminders relative to vehicle service and relative to future service.

Optionally, an input mechanism can be provided to transmit data upon completion of the service work to an accounting module or to a subsystem to facilitate preparation of a bill for services and a notification to the customer by an accounting department. Such data can also be transmitted to a quality control subsystem.

Further input and display mechanisms are provided for the mechanic, for the service representative, or for the layperson using the system to check and provide status information about the automobile's current service program. A data bank is provided to receive and maintain current status information on work assignments being performed for customers and cars. Interactive communication units are provided to originate and receive calls to and from customers regarding the status of the work assignments on their cars. Interactive communication units are also provided to initiate and execute orders for service, for suppliers, and for parts from dealer stock or from external providers.

Other components of the system include interactive computer monitor screens which identify relevant portions of the vehicle, the locations therein, and symptoms. Input mechanisms for the system include touch activating monitor screens and keyboards. A database of scheduled and unscheduled periodic maintenance tasks for various types of vehicles serviced can be linked to the pertinent query screens. This database information can be provided at a geographic distance by use of the Internet or locally through computer memory. Programmed query sets include the categories of engine/drivability, noise/vibrations, transmission, 2 and 4-wheel or more drive, heater/AC, brakes, steering/suspension, power accessories/electrical, and miscellaneous other services.

Further, an interactive computerized process is provided for receiving customer inputs, for compiling and summarizing those inputs, and for developing work orders for service personnel and non-layperson technicians identifying the symptomatic problems that prompted the layperson to seek automobile repair and maintenance. This is accomplished by steps including:

querying the customer and receiving inputs regarding the customer and the automobile ID via computer input and output systems using programmed sets of questions regarding specified vehicle systems and categories regarding the maintenance and/or repairs;

selecting services which are requested and/or needed, including investigative work;

printing, storing and displaying work orders including the provided customer and vehicle ID and assigned services for both the customer and assigned mechanics, and printing reminders for use by the equipment owner or by equipment service personnel relative to prior history, dates or usage mileposts requiring further service, or bar-coded information for future reference.

BRIEF DESCRIPTION OF THE DRAWINGS

Like reference characters designated corresponding parts in the several views.

FIG. 4 is a flow sheet for the category 1, "Engine Drivability", problems.

FIG. 5 is a flow sheet for the category 2, "Noises/Vibrations", problems.

FIG. 6 is a typical flow sheet for the category 3, "Automatic/Manual/4-wheel Drive", problems.

FIG. 7 is a flow sheet for category 4, "Heating/AC", problems.

FIG. 8 is a flow sheet for category 5, "Brakes", problems.

FIG. 9 is a flow sheet for category 6, "Steering/suspension", problems.

FIG. 10 is a flow sheet for category 7, "Power Accessories/Electrical", problems.

FIG. 11 is a flow sheet for the category 8, "Other Services".

FIGS. 12A through 21R are illustrative of computer screens useful for obtaining the information needed under categories 1 through 8.

FIGS. 12 A through 12G illustrate selected computer monitor screens for "Introductory information".

FIG. 13 illustrates a computer monitor screen for the selection of pertinent categories.

FIGS. 14A through 14D illustrate computer monitor screens for the "subcategory 1" program.

FIGS. 15A through 15E illustrate computer monitor screens for the "subcategory 2" program.

FIGS. 16A through 16E illustrate selected computer monitor screens for the "Subcategory 3" program.

FIGS. 17A through 17E illustrate selected computer monitor screens for the subcategory 4" program.

FIGS. 18A through 18D illustrate selected computer monitor screens for the "subcategory 5" program.

FIGS. 19A through 19D illustrate selected computer monitor screens for the "subcategory 6" program.

FIGS. 20A through 20F illustrate selected computer monitor screens for the "subcategory 7" program.

FIGS. 21A through 21S illustrate selected computer screens for the "subcategory 8" program.

FIGS 22A through 22C illustrate selected computer screens for the "Additional Services" program.

FIG. 23 illustrates a computer screen for addressing "Additional Problems."

FIG. 24 illustrates a screen for "Unscheduled Services."

FIG. 26 illustrates an "Estimated Repair Costs" screen.

FIG. 27 illustrates a "Designation of the Service Advisor and Cost Estimate" screen.

FIG. 28 illustrates a screen authorizing repair work and acknowledges criteria under which the repair is to be done.

FIG. 29 is illustrative of a screen providing instructions for the deposition of keys into a lockbox.

FIG. 30 illustrates a screen allowing a designation of whether the customer wishes to "Wait, Drop off the Car, or obtain a Loaner."

FIGS. 32A and 32B depict a representative print out of "Repair Order."

DESCRIPTION OF THE PREFERRED EMBODIMENTS

Figure 1:
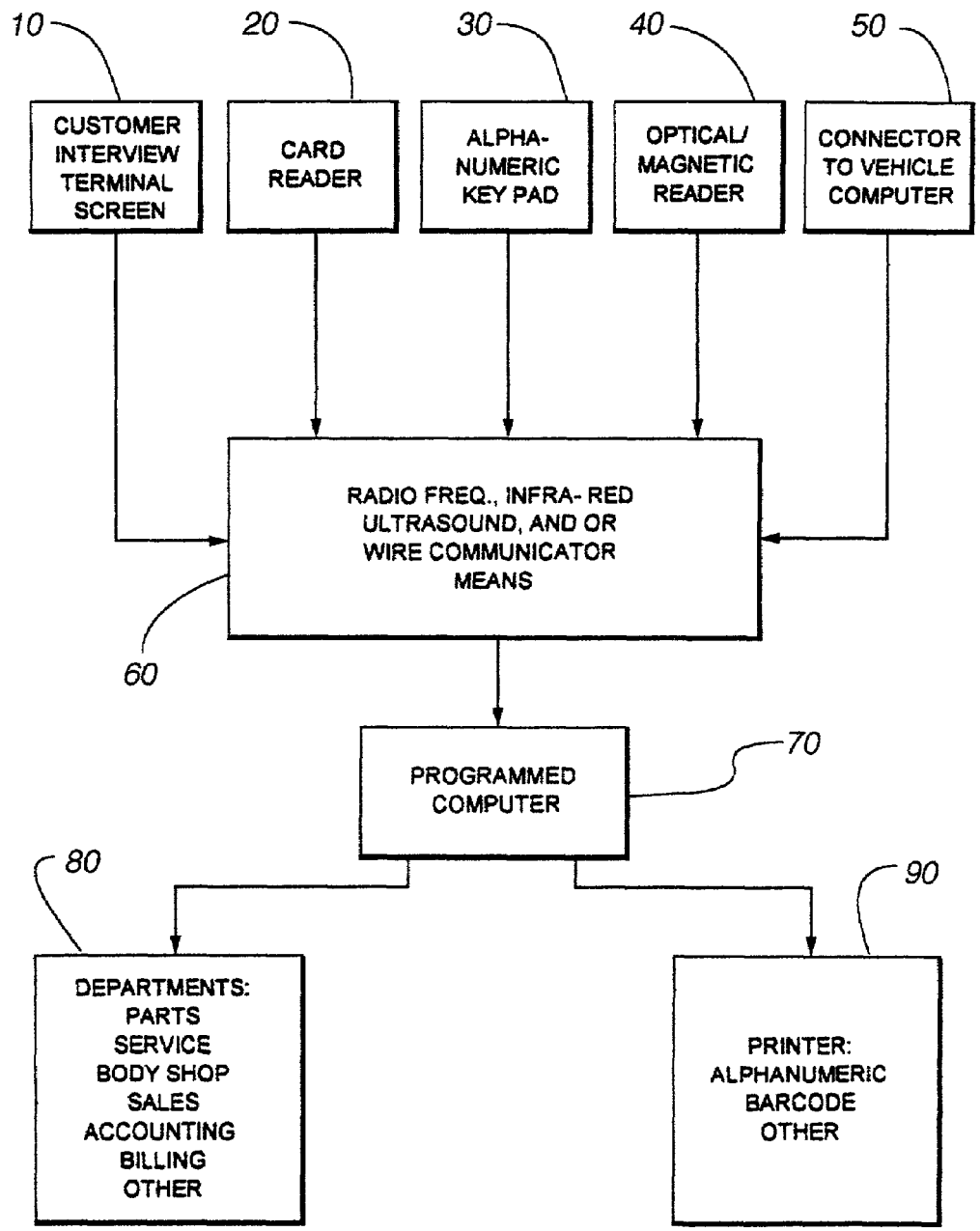
FIG. 1 provides a block diagram of the system as it would be used at a typical automobile dealership or repair shop.

FIGS. 1 and 2 provide an overview of the systems and methods of the invention. FIG. 1 is a system overview of the invention. A customer brings an automobile to a repair center where the customer interacts with a customer interview terminal screen 10.

Console 10 can include a portable personal computer or, at least, a freestanding terminal serving a master computer. Console 10 comprises input means and interactive display means, such as a touch-active CRT screen such as disclosed in U.S. Pat. Nos. 4,449,186, 5,404,443, 5,488,575; 5,499,707; 5,537,315, and 5,539,429 incorporated herein by reference. Such touch-active screens may incorporate audio output means, as disclosed in U.S. Pat. No. 4,449,186. The systems of the invention is designed so that hardware and software cooperate to provide convenient means for the customer to provide the necessary symptomatic information to facilitate service/repair. In the embodiment using a touch active CRT screen, most information is provided via the touch-active screen in response to a menu-driven series of queries or prompts. Some of the input information (i.e., vehicle ID, customer ID, credit card payment information, and the like) can be provided by inserting into a card reader 20 a credit card or other identify card issued by the repair center to minimize effort on the part of the customer, and to minimize errors as well. Such cards can be used to unlock and provide access to console 10 and other input devices to minimize vandalism or other unauthorized activities. Alternatively, systems can be used which automatically sense the vehicle ID and/or the condition of the vehicle system such as; for example, an optical/magnetic reader 40, see e.g., U.S. Pat. No. 5,058,044. To augment the touch-active screens, a standard or simplified alphanumeric keyboard 30 can be provided, and optionally provisions can be made for the customer to dictate into the input system using devices such as the voice-activated system disclosed in U.S. Pat. No. 5,586,037.

In addition to the customer direct input of ID data, observed symptoms, and requests at this intake transaction, the customer may be assisted by a service advisor or by other representatives of the repair center. Such representatives may enter information at console 10, and/or use a hand-held device such as disclosed above. Optionally, readings may be taken from the vehicle onboard computer 50 at this point using a hand-held unit or other computerized monitor. In this way, error codes from the onboard computer can be read, analyzed, and considered in writing up a vehicle service order. This mode of operation will normally be available only if the customer is willing to wait and if there is a repair center representative available to take the readings, unless an automatic sensor system is used as in U.S. Pat. No. 5,557,268. A service advisor may introduce information into the system via console 10, either during the customer intake transaction or thereafter. Preferably, the service advisor will employ a hand-held unit incorporating the functions of console 10.

Console 10 displays menus, queries, prompts and input/output data on a CRT screen, and upon command, or upon completion of the transaction, a printer 90 prints out materials, or other similar printers 90 can be attached to the system by way of input devices or networked to computing device 70 for the customer's use.

The information inputs all enter computing device 70 that could include a programmed computer, as shown, having a Central Processing Unit (CPU), a device having firmware embedded into microchips, a general personal computer having specialized application programming. The information entered into computing device 70 is analyzed, summarized, compiled, and correlated. The system may query the customer further to fully develop the input information before closing the transaction. When the initial information is obtained, the system prepares a service order that includes a standardized reporting of the symptomatic problems that prompted the lay person to seek repairs of the vehicle. The present invention can be combined with a diagnostic service program that outputs service needs where the needed service and/or repairs are clear. More typically; however, more information is needed to determine the service required; therefore, the system can print out and display a standardized summary of the symptomatic problems containing queries for the mechanic and/or service advisor to analyze. The service mission is subject to change after readings have been taken from the vehicle onboard computer.

A finished service order will be transmitted to mechanic, service representative, technician or other professional via printer 90 and/or console 10, which displays the order on a CRT screen. Using similar input means to those described for console 10, the mechanic can submit information to modify the service order, query the service advisor as to what work is approved, and advise the system when the job is completed or delayed. Such inputs are transmitted to computing device 70, which then stores and processes the inputs. Events including job completion or delay are transmitted via suitable communications media, such a telephone, facsimile, or e-mail, to the customer using customer notification programs. Additionally, in the process of the service/repair job, computing device 70 can be used to optionally identify and order materials, spare parts and the like for the service/repair using an ordering program.

Figure 2A:
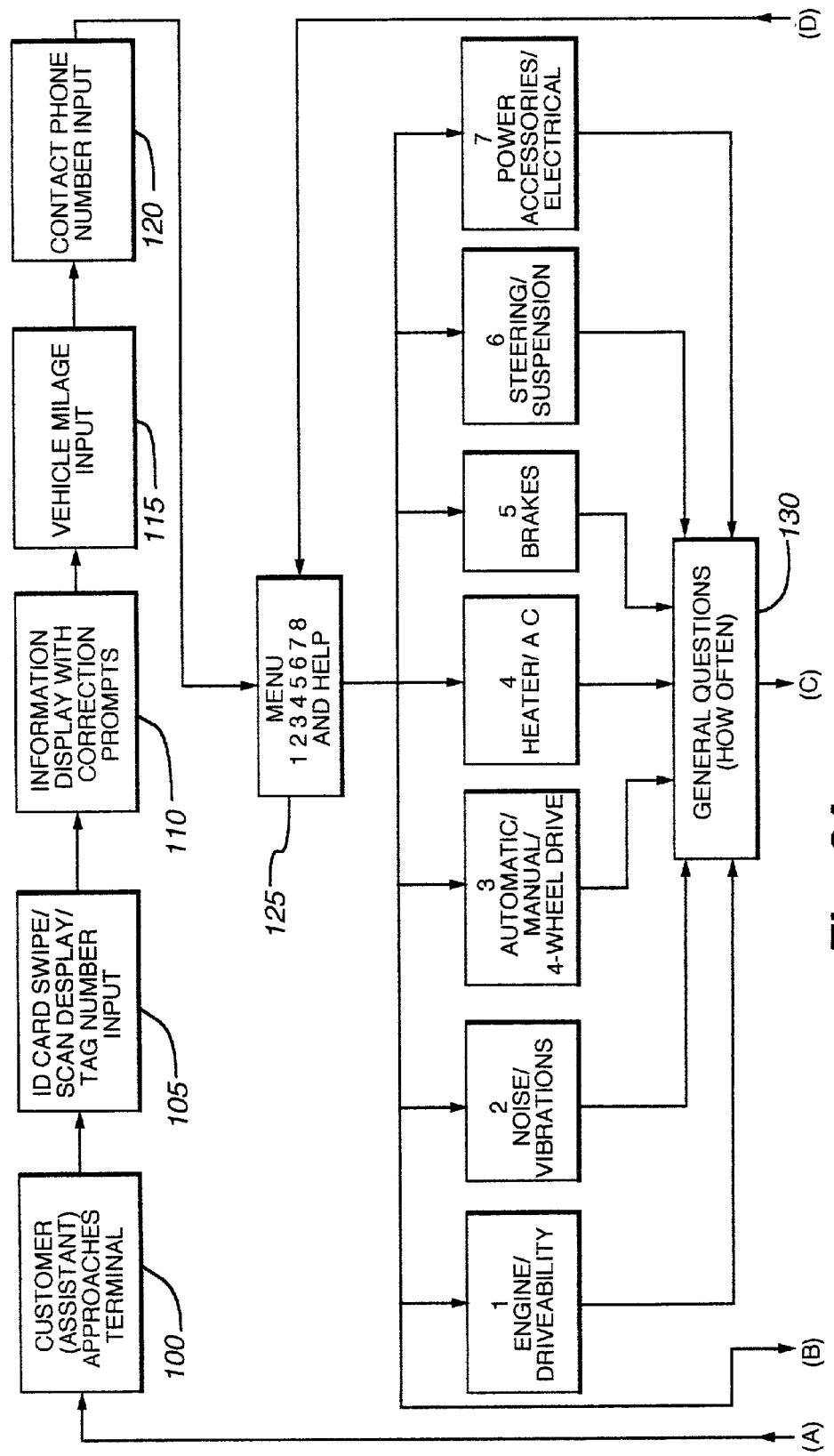
FIGS. 2A and 2B are a master flow sheet illustrating the organization and operation of the system.
Figure 2B:
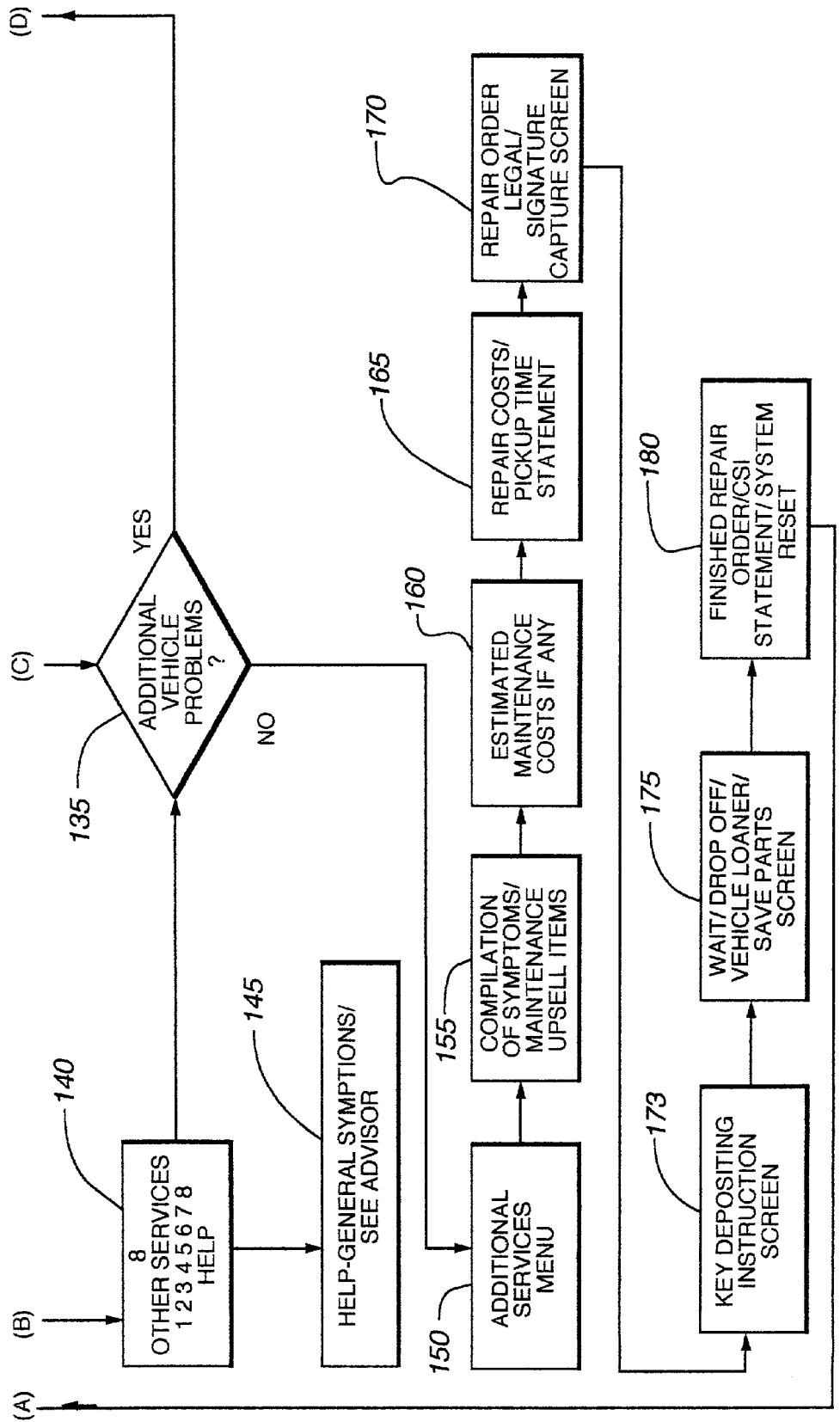

FIGS. 2A and 2B show a master flow sheet illustrating the option of the computerized process outlined in FIG. 1. To initiate the intake process, a customer approaches terminal 100. Information input can be by scanner, e.g., FIGS. 12A and 12B, or other means, e.g., a typewriter. Preferably, the information is generally input using a touch screen. When a numeric input is needed, a keypad will be provided. e.g., 12A and 12B. When alphabetic and numeric information is needed, an alphanumeric keypad will be provided, e.g., FIG. 12C. Specific information is input into the computer of a preferred hand-held unit by stylus pressure one a square, e.g., FIG. 13; a dot or a circle, e.g., FIG. 14C. Basic ID, and, where selected, credit card information can be provided via an ID card reader 105 and/or submitted via touch-active screen or keyboard. The information provided appears on display 110 which provides correction prompts or queries. For example, if the current vehicle mileage and phone contact information are not provided initially, they can be submitted upon request as at steps 115 and 120. When the necessary, intake information is provided, the display shifts to a main menu 125 which offers multiple choices as well as a "Help" function. In FIG. 2, main menu categories include the Engine/drivability (1), Noise/vibrations (2), Automatic/manual/4wheel Drive Transmission (3), Heater/AC (4), Brakes (5), Steering/suspension (6) Power accessories/electrical (7), and Other services (8) subcategories. These categories are supplemented (See FIG. 33) for vehicles that are more complex than automobiles, e.g., a Peterbilt truck, and vehicle-based equipment, e.g., a cherry picker and a front loader. Each of these menu choices leads to subroutines containing multiple menu choices to guide the customer through an interrogation process which identifies symptomatic problems to be corrected and/or routine services to be performed. Exemplary flow diagrams for these subcategories are provided in subsequent figures discussed below. Upon completion of any of the subroutines 1 through 8, the display shifts to a "General Questions" subroutine 130 which queries the customer as to how often the problem(s) occurred and similar questions. After responding to these queries, the customer is queried at step 135 to determine if there are additional vehicle problems; if "yes", the program reverts to the main menu for further choices. Selection of "other services" menu 140 provides options for choosing various maintenance services as well as a "Help" option which refers to the customer to a service advisor as shown at 145.

Upon completion of the interrogation via the categorical subroutines, the customer is automatically transferred to "Additional Services" subroutine 150, which offers further choices discussed below for routine service operations and the like. Once the customer exits this menu, the customer is transferred to subroutine 155 which uses Boolean and other processing logic to provide a compilation of the symptoms and of requested service items and displays the compilation along with a menu of additional accessories or services which can be purchased. Following this, subroutine 160 provides a cost estimate of any requested maintenance services, and subroutine 165 provides a cost estimate of repair costs and pickup time. The repair/work order is presented by subroutine 170, and the customer's electronic signature is then captured. On signature of the repair order, instructions for leaving the key(s) in a secure depository are shown at 173. Subroutine 175 then queries whether the customer will wait for the vehicle, drop it off, or request a loaner vehicle. Subroutine 175 also queries the customer's requests with regard to the disposition of the used parts. Finally, at step 180 the finished repair estimate is displayed and printed out for the customer, for the service advisor and for the mechanic, technician or other professional service provider.

Figure 3A:
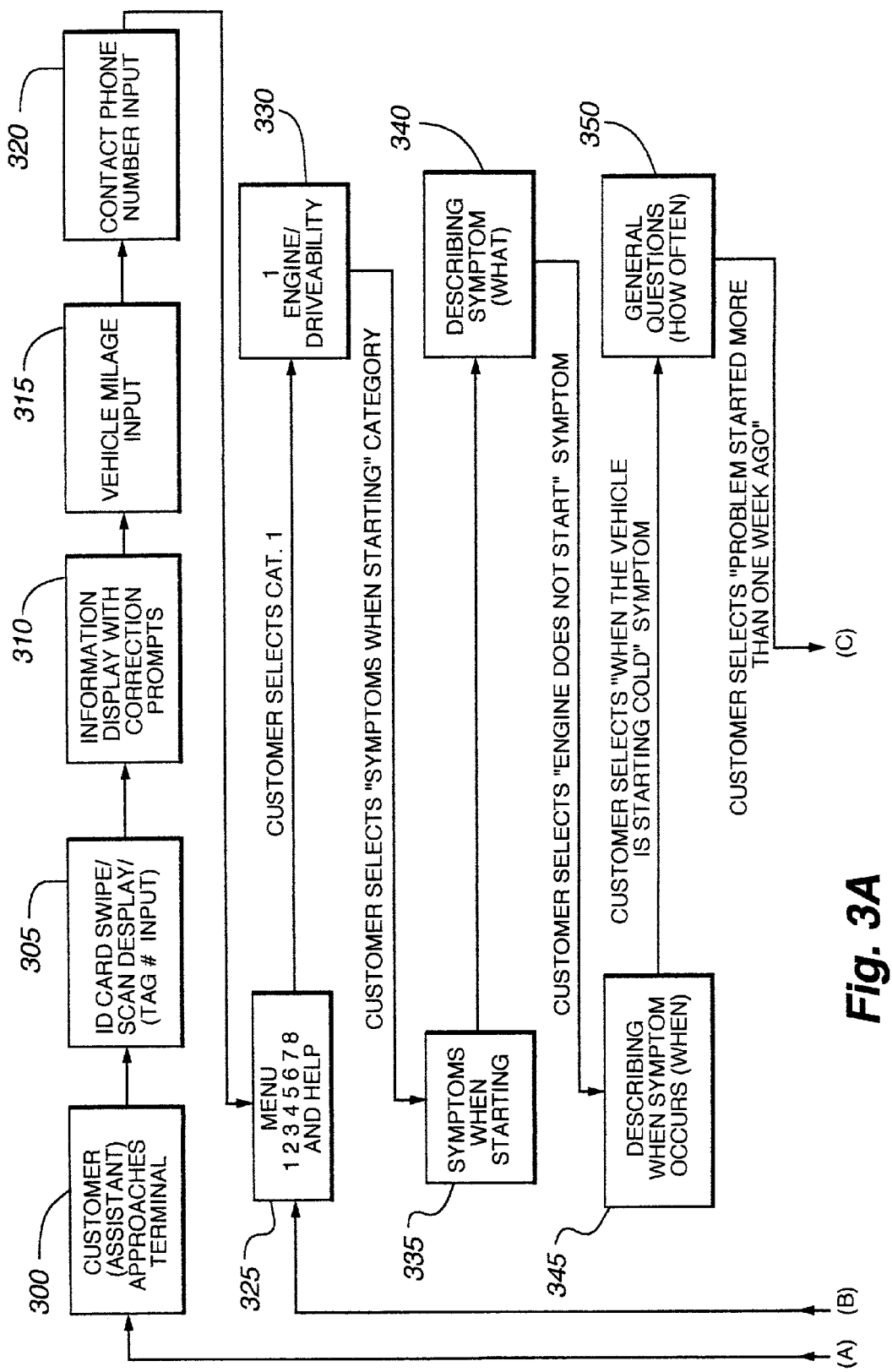
FIGS. 3A and 3B illustrate a "customer service process" of using the system.
Figure 3B:
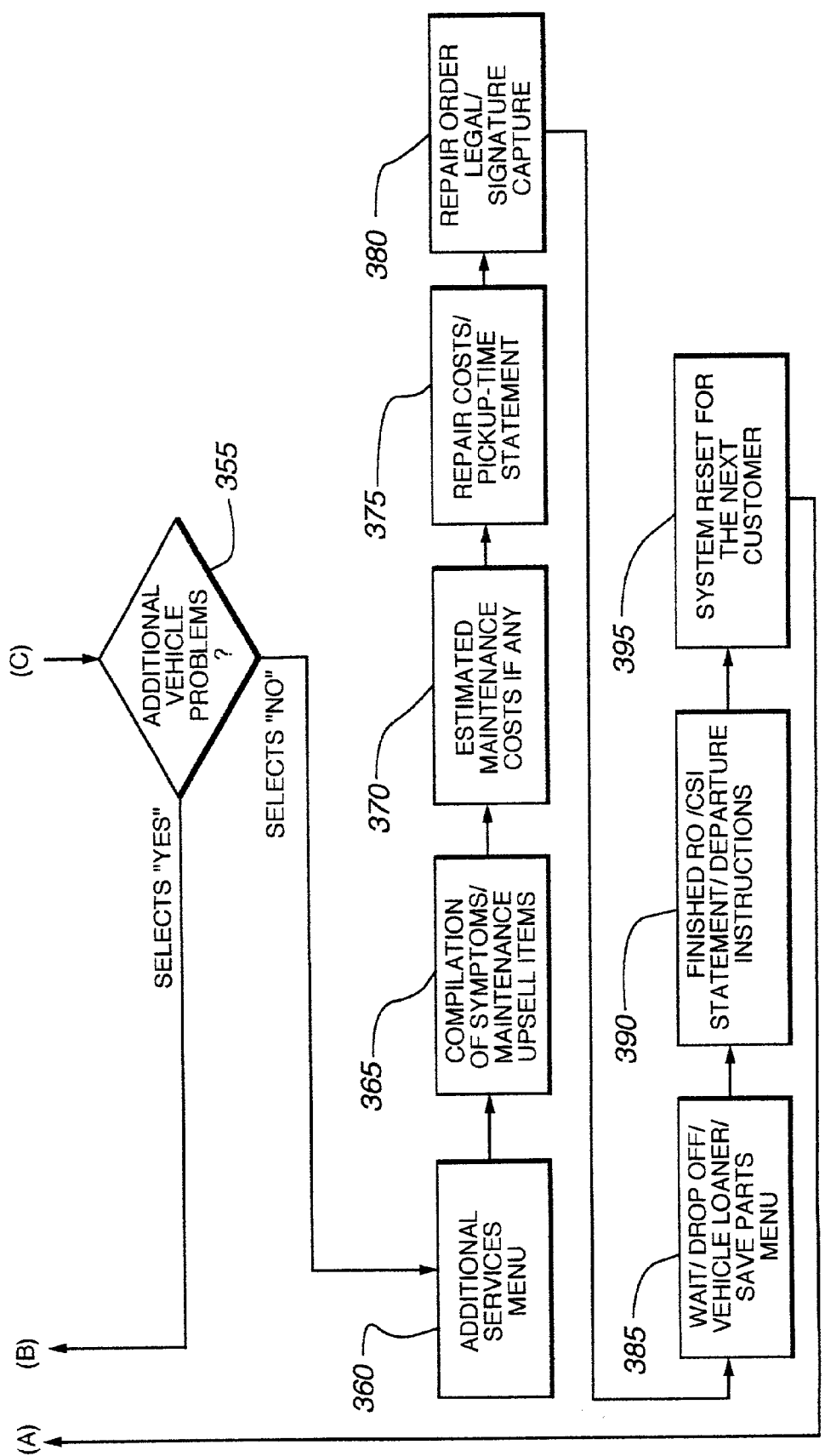

FIGS. 3A and 3B illustrate a customer's interaction with the system. As in FIG. 2, a customer interacts with blocks 300, 305, 310, 315, 320, and is then transferred to main menu 325. Category 1, engine/drivability, is selected by the customer at 330 and menus are presented as in FIG. 4. The customer is exposed to a succession of computer monitor screens in the course of selecting from the menu, as is illustrated in FIGS. 12A through 12G.

As shown in FIG. 3, the customer selects the "symptoms when starting" category at 335, and thereafter is called upon to describe the symptoms at 340 and when they occur at 345. After selection of the latter, the system transfers to the "General questions" subroutine at 350. After this question is answered, the system transfers to the "Additional vehicle problems" subroutine at 355. In this case, the customer selects "NO," and is transferred to the "additional services" menu at 360. Since the customer chose no additional services at 355, the system compiles and summarizes the symptoms and any requested maintenance services at 365 and presents the customer with a menu of additional merchandise and services which can be purchased. Subroutine 370 presents the customer with the estimated maintenance costs (if any), and subroutine 375 presents a statement of estimated repair costs and pickup time. The system then captures the customer's signature at 380, queries as to whether customer will wait or drop off the vehicle with the repair organization, whether a loaner is required, and whether parts are to be returned as shown in block 385. Finally, the finished repair order is displayed and printed for both the customer and the mechanic at 390. The system then resets for the next customer at 395.

Figure 4:
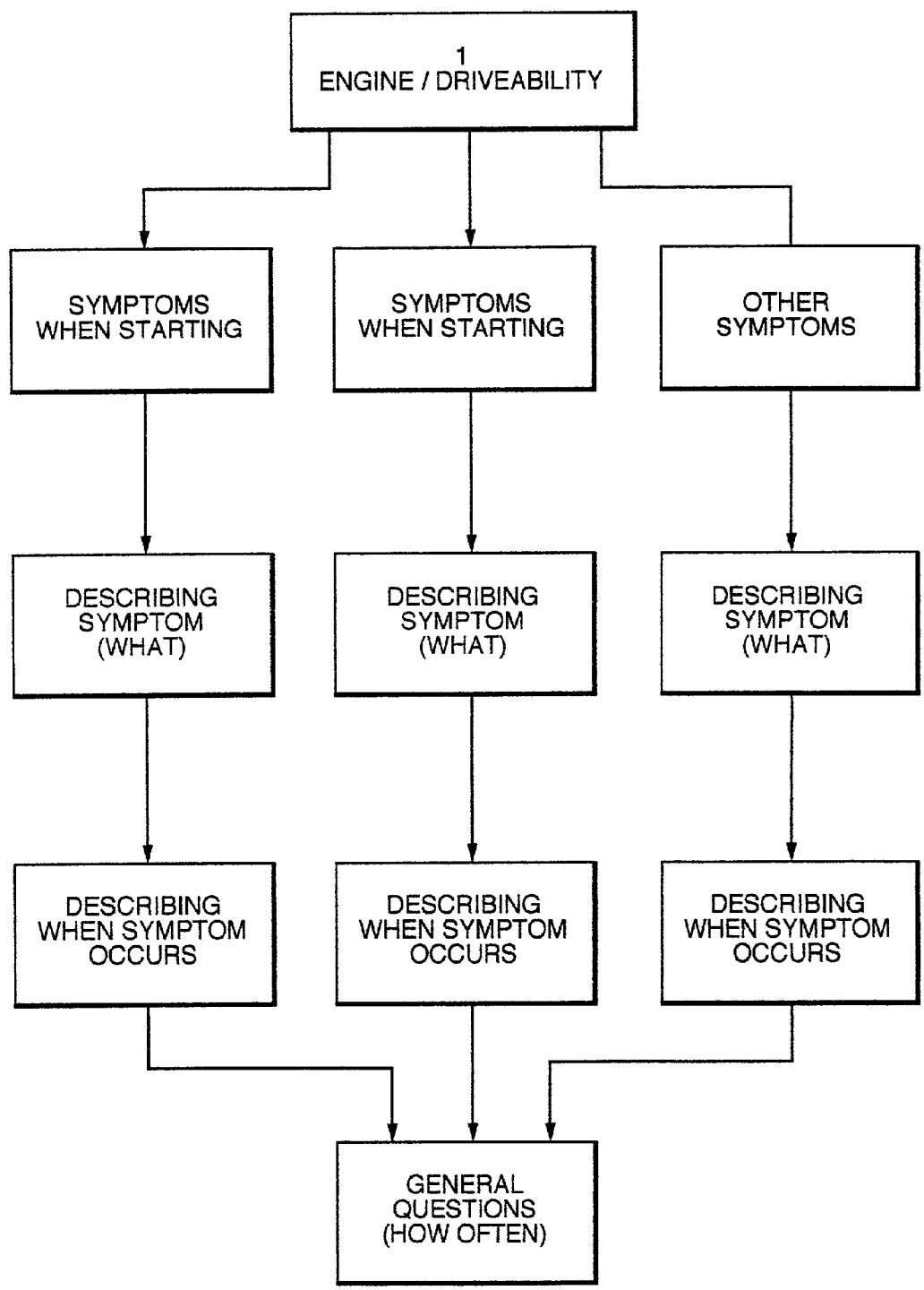
FIGS. 4 through 11 show queries for each of the subcategories of FIGS 2A-2B.

FIG. 4 illustrates the operation of the "engine/drivability" menu (category 1). The customer is initially presented with a choice as to describing symptoms which occur when starting or driving, or "other symptoms". Given any of these three choices, the customer is asked to describe the nature of the symptoms and to describe when the symptoms occurred. Optionally, inputs from the service computer 101 of FIG. 35 can be provided at this point to provide further information on the nature of the symptoms and when they occurred. After these questions are answered, the FIG. 4 subroutine transitions to a "General Questions" subroutine to describe how often the symptoms occurred. From the General Questions subroutine, the customer selects whether or not there are Additional Vehicle Problems. If none, the customer proceeds to Additional Services, if "yes" is answered, the customer is returned to the Main Menu to make another choice.

Figure 5:
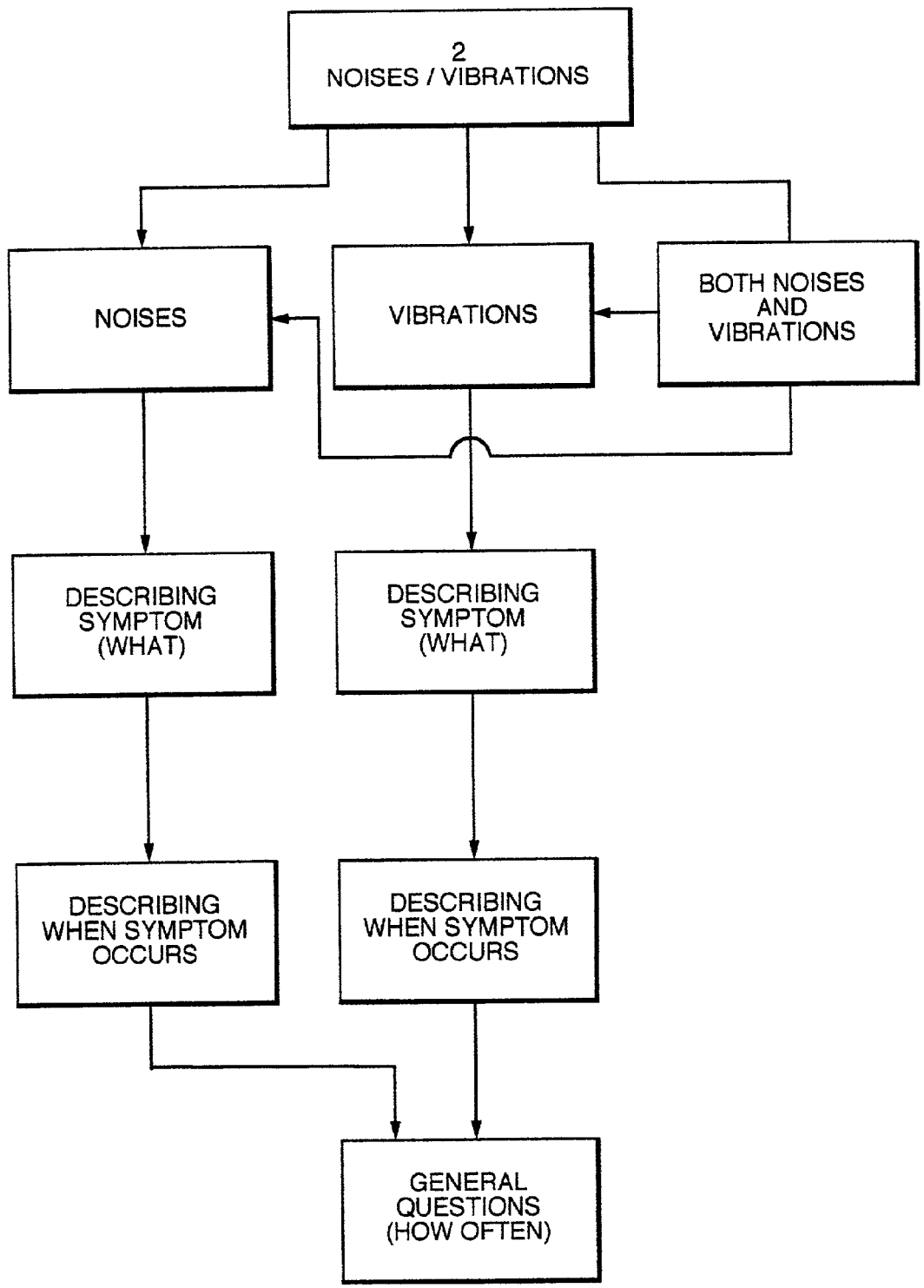

FIG. 5 illustrates menu choices for "noise/vibrations" (Category 2). The initial menu allows the customer to select noise or vibrations alone or a combination of both. Whatever the choice, the customer is then queried as to what the nature of the symptoms are, when they occurred, and where the symptom occurred. Input from FIG. 35 service computer 101 can be provided to assist in the analysis. Finally, the customer is queried as to "how often" the symptoms occurred. At this point, the computer advances to "Additional Vehicles Problems" at 135.

Figure 6:
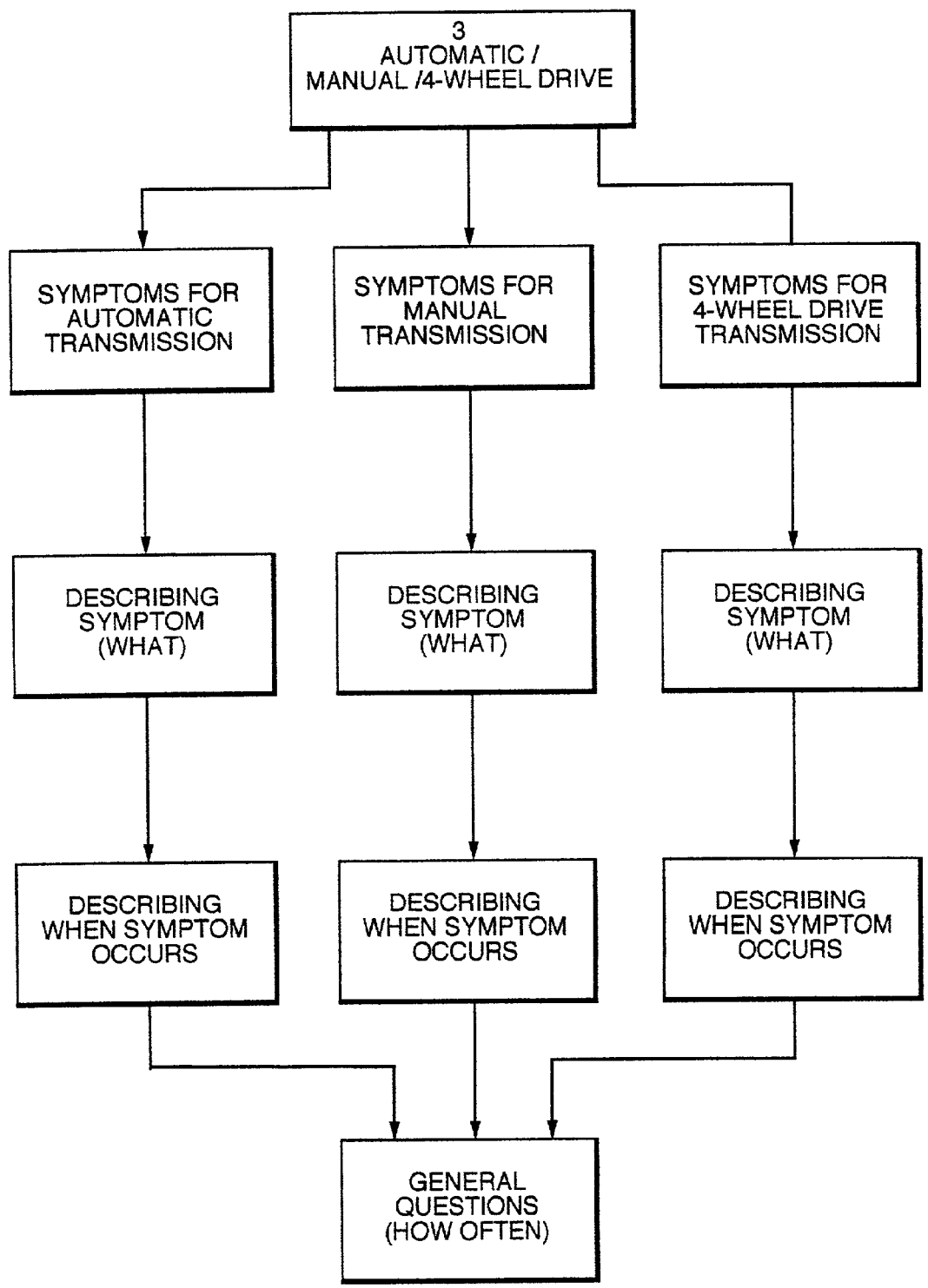

FIG. 6 illustrates menu choices for a "automatic/manual/ 4-wheel drive" transmission check (Category 3). The initial menu requires selection as to automatic or manual transmissions or 4-wheel drive. Once a selection is made the customer is queried as to the nature of the symptoms and when they occurred. After these questions are answered, the customer is queried as to how often the symptoms occurred. After all of these questions have bene answered for a subcategory, the customer is queried as to whether there are problems in another subcategory. If not, the system moves to a closing sequence. If the customer indicates that there are problems in another subcategory, (e.g., problems with the 4-wheel drive in addition to the transmission), the computer returns to the main menu at 125 for another selection.

Figure 7:
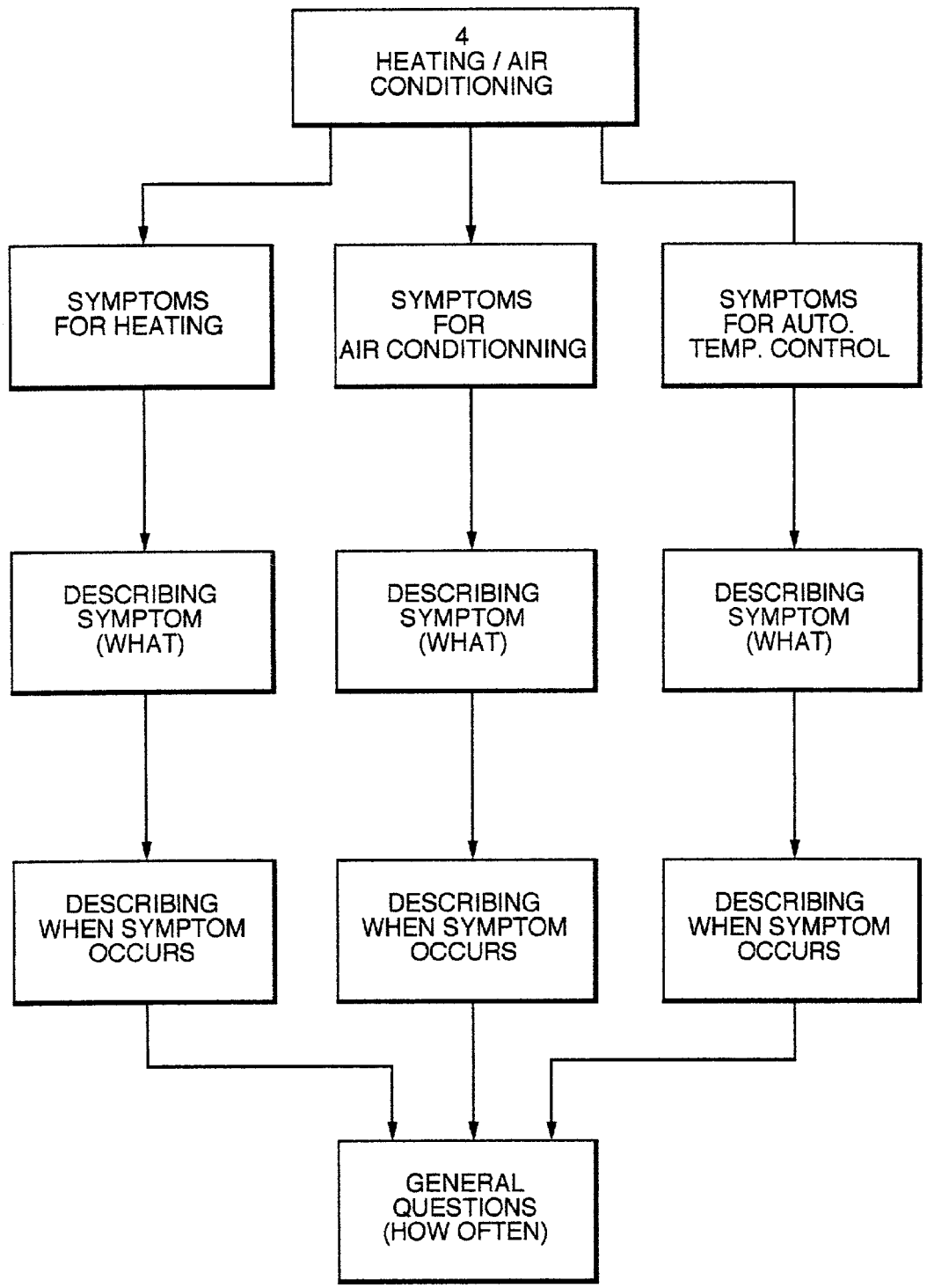

FIG. 7 illustrates the option of the menu for "Heating/Air Conditioning" (Category 4). The initial menu selections are for symptoms of heating, air conditioning or automatic temperature control. Once a subcategory is selected, the customer is again called upon to describe the nature of the symptoms and when they occurred. With these questions answered, the system transitions to "General Questions", including how often the symptoms occurred. After these questions are answered, the customer is called upon to declare whether there are additional problems in other subcategories. If not, the closing sequence is actuated. If yes, the customer is returned to the menu at 125 to make another selection.

Figure 8:
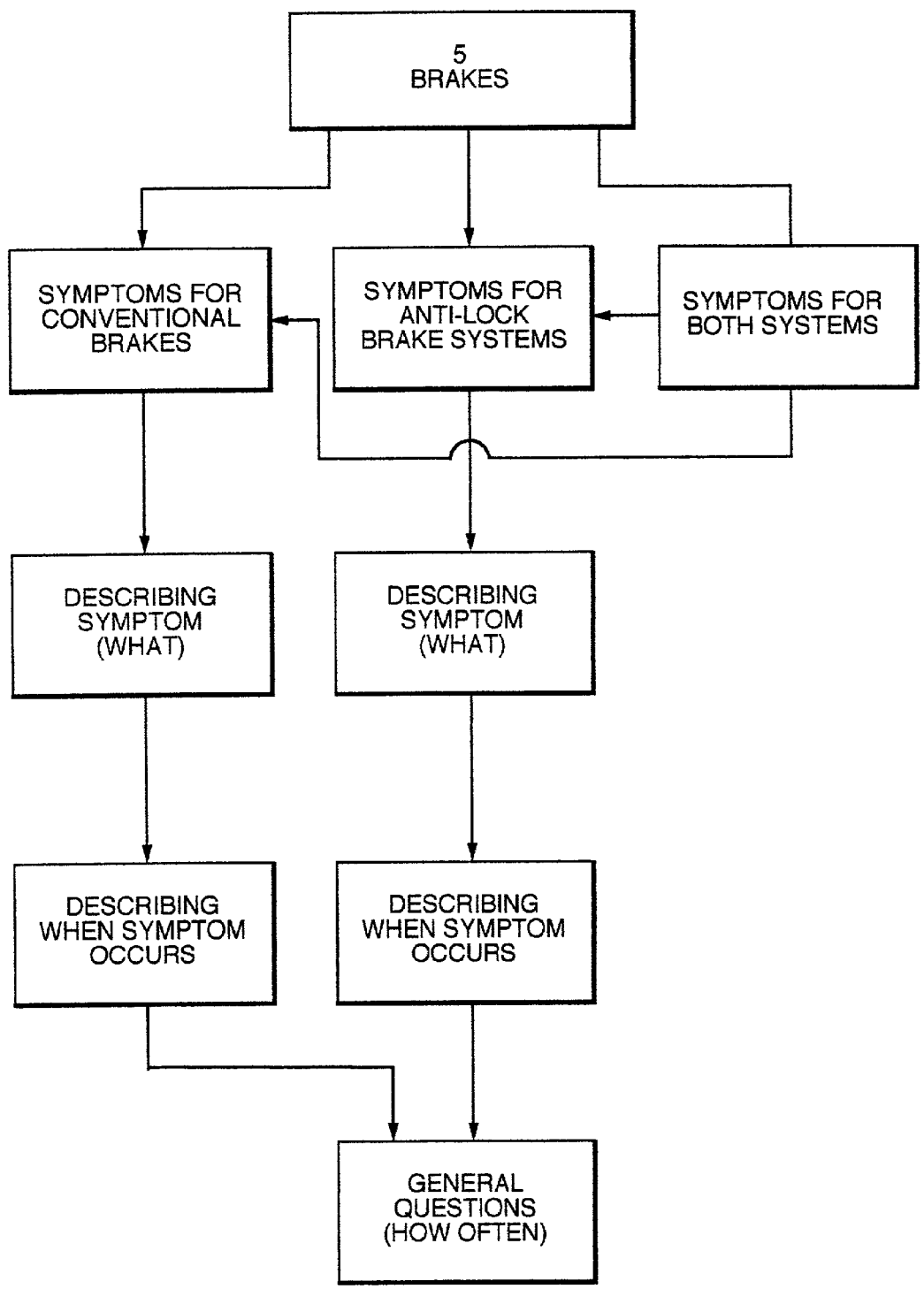

FIG. 8 illustrates the menu choices for "Brakes" (Category 5). The initial menu selections are for conventional brakes, anti-lock brake systems, or combinations of both. As in the other categories, the customer is called upon to describe the nature of the symptoms, when they occurred, and how often they occurred, before returning to the main menu or before going through the closing sequence.

Figure 9:
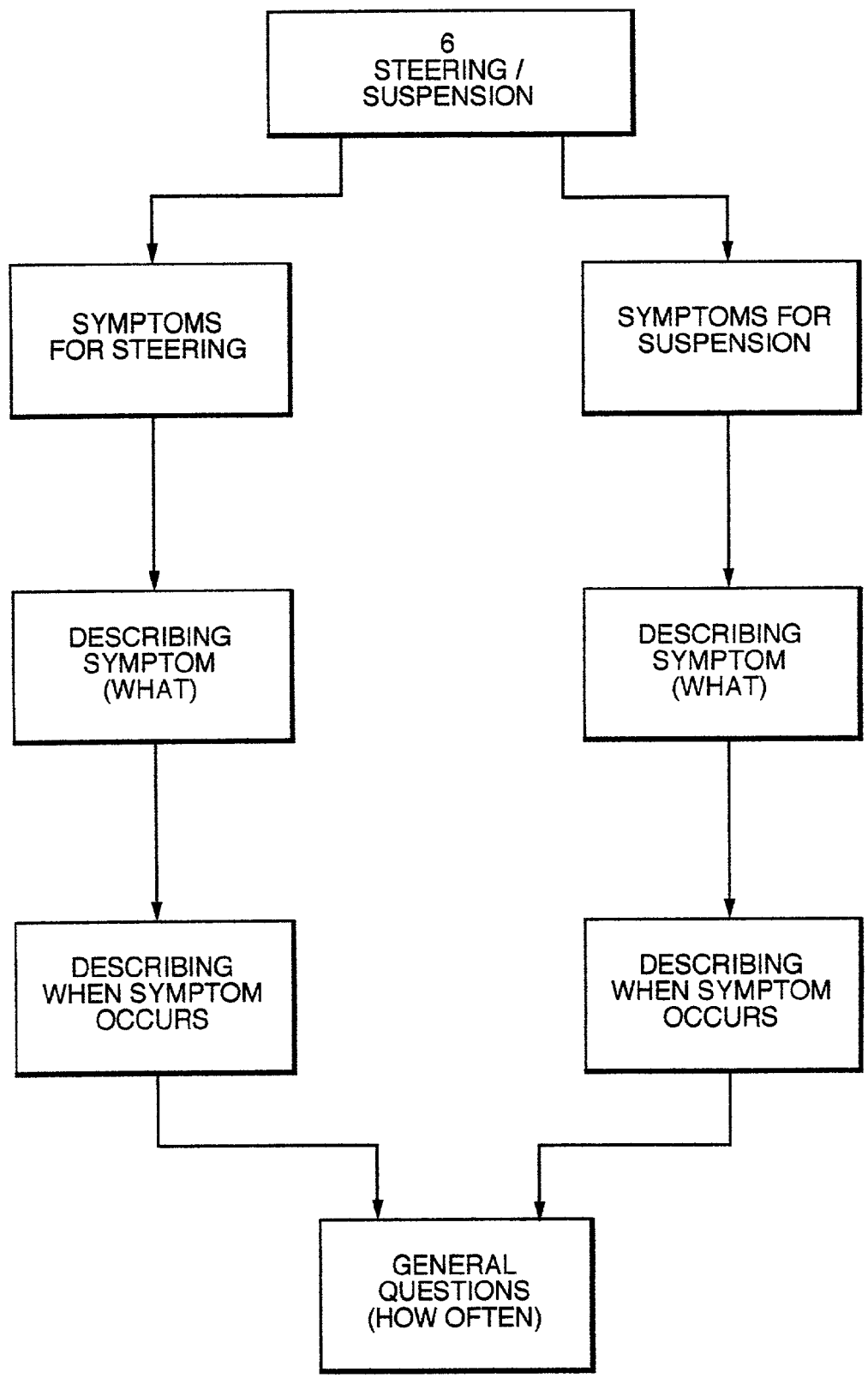

FIG. 9 illustrates the menu choices for "Steering/Suspension" (Category 6). The initial menu choices are for steering or suspension problems, and after making a selection, the customer is called upon to described the nature of the symptoms, when they occurred, and how often they occurred. After these questions are answered, the customer is queried whether there are any symptoms in any other subcategory (e.g., suspension in addition to steering). The customer is then returned to the main menu or the customer is passed through the closing sequence.

Figure 10:
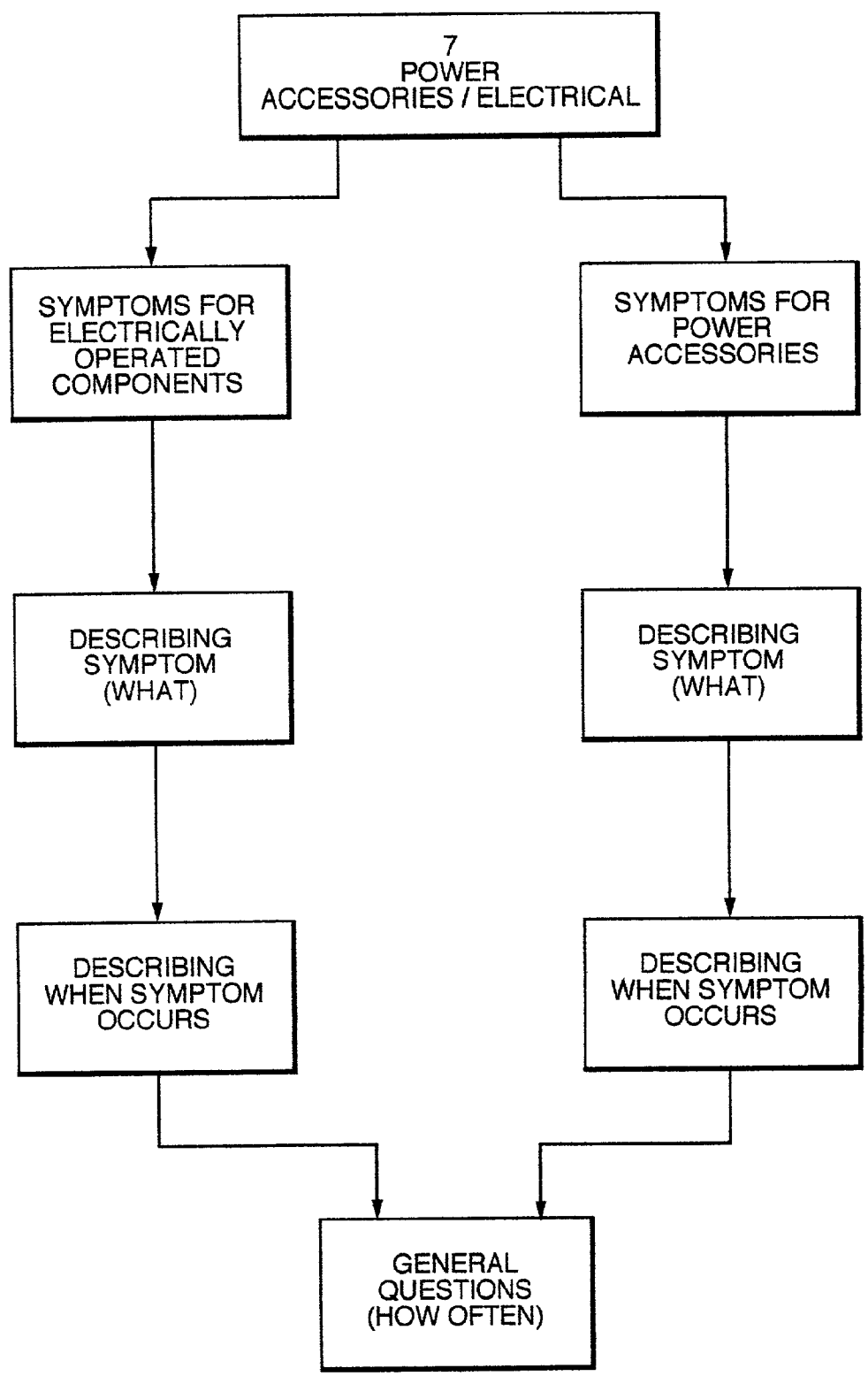

FIG. 10 illustrates the menu choices for "Power Accessories/Electrical" (Category 7). The initial menu choices are for electrically operated components and power accessories, and once a selection is made; the customer is queried as to the nature of the symptoms, when they occurred, and where they occurred. Once these questions are answered, the customer is queried as to how often the symptoms occurred. Upon completion of these questions, the customer is queried as to whether symptoms exist in another subcategory. If not, the customer is presented with the closing sequence.

Figure 11:
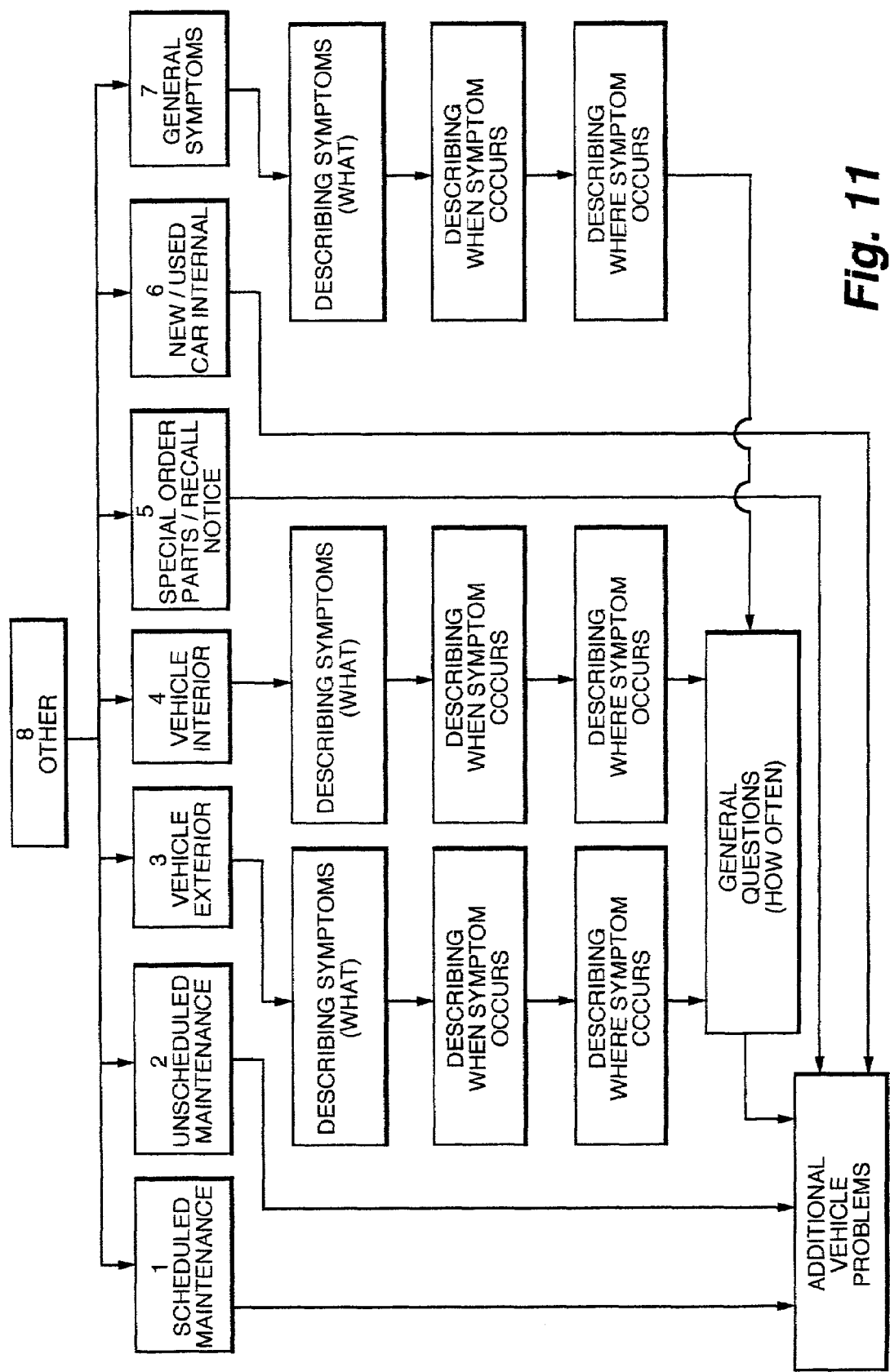

FIG. 11 illustrates the menu operation for "Other" problems (Category 8). The initial menu choices are scheduled and unscheduled maintenance, i.e. maintenance which is conducted at predetermined total mileage figures or at periodic mileage/time intervals. Once selections are made for any required maintenance in these subcategories, the system queries the customer regarding "Additional Vehicle Problems". Subcategories 3 and 4 provide menu choices regarding problems with the vehicle's exterior and interior. Having selected one of these subcategories, the customer is queried as to the nature of the symptoms, when they occurred and where they occurred, before being asked general questions including how often they occurred. When queries and answers for each subcategory are completed, the customer is queried as to whether problems/symptoms exist in other subcategories. If so, customer is returned to the main menu for another selection. If no, the customer progresses through closing sequence. Subcategory 5 covers special orders or parts and recall notice items. Subcategory 6 deals with new or used car problems. In subcategory 7, "General Symptoms", the customer is again called upon to describe the nature of the symptom, when they occurred, where they occurred then how often the symptom occurred.

Figure 12B:
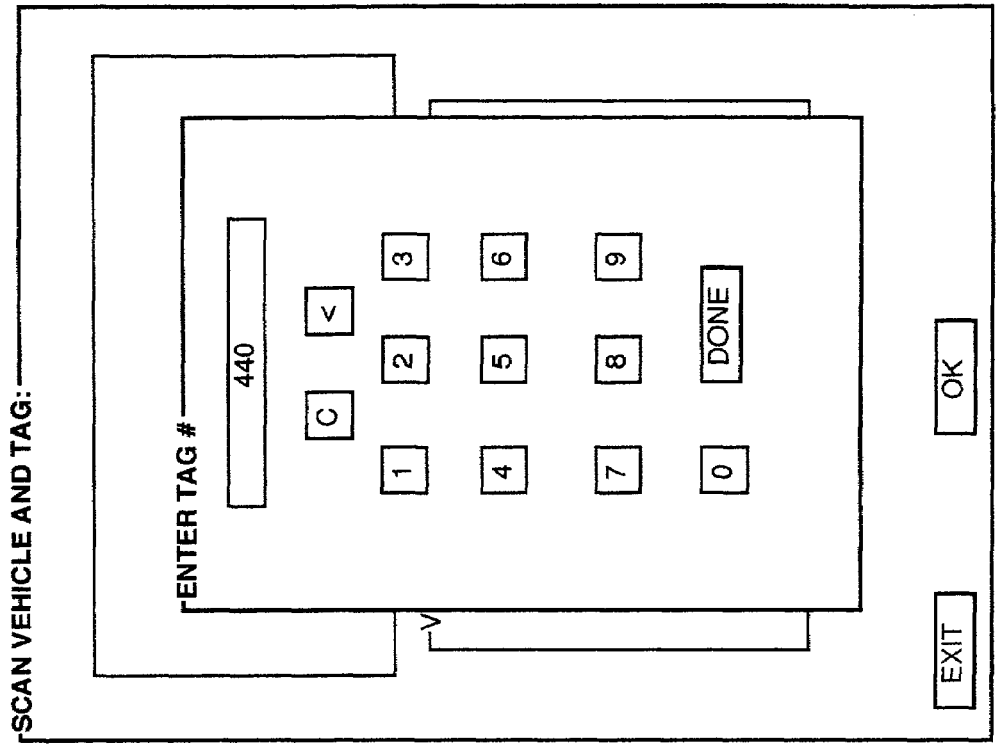
Figure 12A:
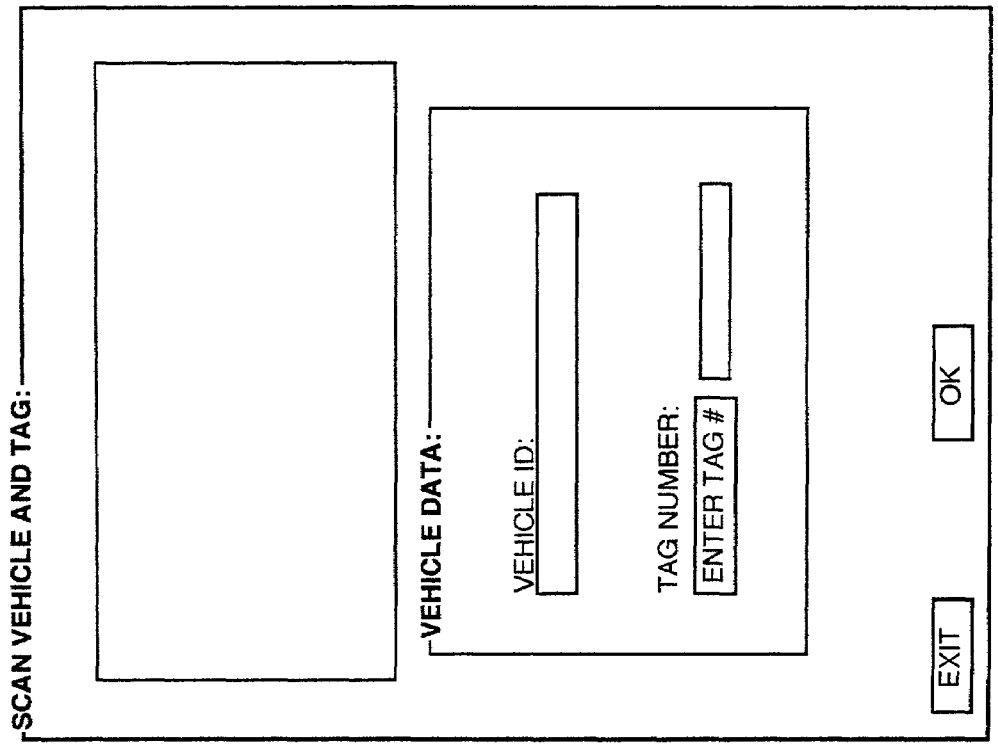
Figure 12F:
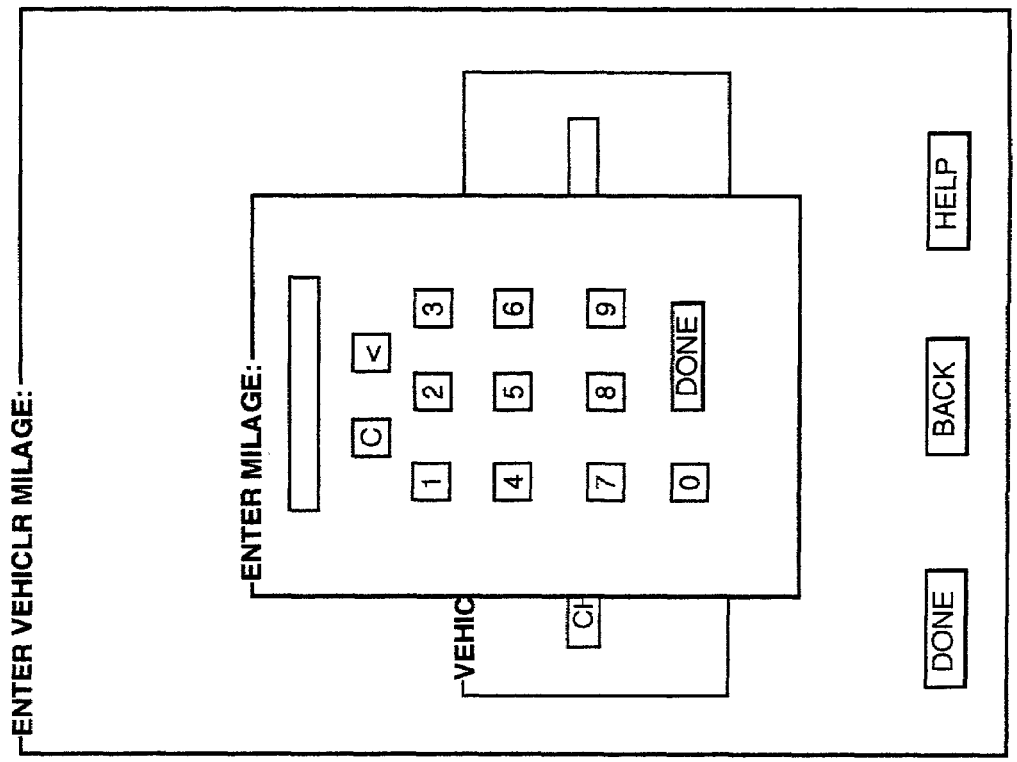
Figure 12E:
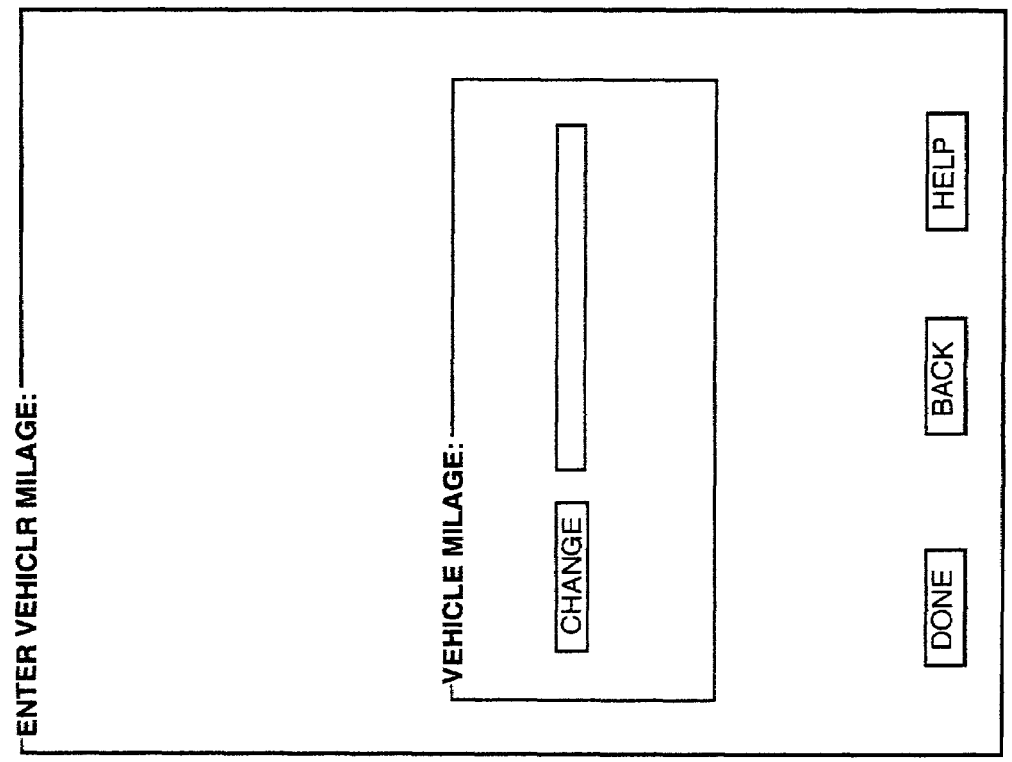

FIGS. 12A and 12B illustrate computer screens which relate to information obtained by optic, magnetic or RF (including microwave) scanning. As shown in FIGS. 12B and 12C, information also may be input through touch screen technology or other input menus, not specifically shown. FIGS. 12C through 12D illustrate screens which enable the customer to input personal information. FIGS. 12E and 12F are illustrative of screens enabling the customer to input "Mileage" by pressing a "change" designator to bring up a numeric keypad. FIG. 12G similarly enables the customer to enter a telephone number for use in telephone contact during the period that the automobile is in the service/repair shop. An illustrative keypad screen is omitted.

FIG. 13 illustrates a screen used for the selection of one or more repair categories. Category 1, "Engine/Drivability" has been selected as indicated by the outline around that category.

FIGS. 14A through 14D illustrate computer monitor screens for the "Category 1" program. FIG. 14A identifies the category and asks for the selection of "Symptoms". FIG. 14B illustrates a screen for "Symptoms when starting". FIG. 14C illustrates a screen for "When do you notice it", i.e., questions about the nature and frequency of the symptoms. FIG. 14D illustrates a screen querying the customer regarding "Symptoms when driving".

Figure 15D:
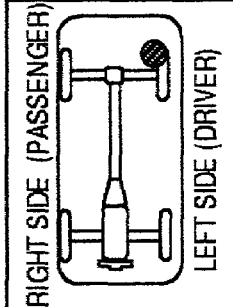
Figure 15C:
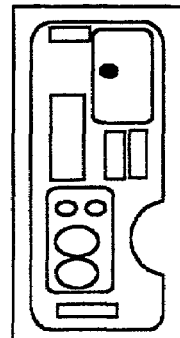

FIGS. 15A through 15B illustrate selected computer monitor screens for "Noises and Vibrations", the Category 2 program. FIG. 15A illustrates a computer screen representing the selection of the "Noise or Vibration" category, including selections for noises and/or vibrations. FIG. 15B illustrates a screen representing the selection of the "Noise information" subcategory. FIG. 15C illustrates the screen presenting the query "Where is it coming from?" via diagrams of an automobile. FIG. 15D illustrates a screen querying "When does it happen" containing generic questions pertaining to noises and/or vibrations. FIG. 15E illustrates the screen requiring the selection of vibrational categories wherein "Shudder" has been selected.

FIGS. 16A through 16E illustrate selected computer monitor screens for a Category 3, "Automatic/Manual/4-wheel Drive Transmission" program.

FIG. 16A illustrates the computer screen for the category of "Transmission" information, offering choices for automatic or manual transmissions or an exemplary 4-wheel drive. FIG. 16B illustrates a screen for the "Automatic transmission" subcategory offering choices as to types of symptoms observed. FIG. 16C illustrates a screen for the "Manual transmission" subcategory, offering choices of various symptoms observed. FIG. 16B illustrates a screen for the "4-wheel drive transmissions" subcategory, offering choices as to various symptoms observed. FIG. 16E illustrates a screen querying "When does it happen", with a set of generic questions that are applicable to any of the subcategories.

FIGS. 17A through 17E illustrate selected computer monitor screens for the category 4, "Heater/AC" program. FIG. 17A illustrates a computer screen for defining the Heating or Air-Conditioning problem. FIG. 17B illustrates a screen for the "Heating" category. FIG. 17C illustrates a screen for the "Air Conditioning" category. FIG. 17D illustrates a screen for the automatic temperature control system. FIG. 17E illustrates a screen providing questions as to "When does it happen."

FIGS. 18A through 18D illustrate selected computer monitor screens for the category 5 "Brakes" program. FIG. 18A illustrates a computer screen for defining the particular brake system. FIG. 18B illustrates a screen for defining one or more problems with a conventional braking system. FIG. 18C illustrates a screen for defining one or more problems with regard to anti-lock braking system. FIG. 18D illustrates a screen querying "When does it happen."

FIGS. 19A through 19D illustrate selected computer monitor screens for the category 6, "Steering and Suspension" program. FIG. 19A illustrates a computer screen for defining whether the problem relates to steering or to suspension. FIG. 19B illustrates a screen for the "Steering information" subcategory, including questions regarding various symptoms observed with regard to the steering. FIG. 19C illustrates a screen for the "suspension" subcategory, including questions regarding various symptoms that were observed. FIG. 19D illustrates a screen querying "When does it happen", including questions regarding the operating modes and speed when either steering or suspension symptoms occur.

Figures 20E, 20F:
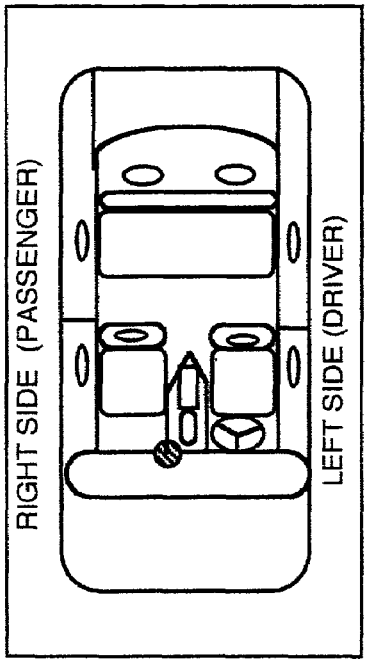

FIGS. 20A through 20F illustrate selected computer monitor screens for the "Electrical" program. FIG. 20A illustrates a computer screen offering choices of problems connected with "electrically operated components" or "power accessories". FIG. 20B illustrates a screen which includes questions regarding specific components requiring service. FIG. 20C illustrates a screen including questions regarding "Power accessories" where problem symptoms were observed. FIG. 20D illustrates a screen for narrowing the problem terms. FIG. 20E illustrates a screen for a "When does it happen" query. FIG. 20F illustrates a screen for identifying an area of the automobile where the problem is believed to be located.

Figure 21F:
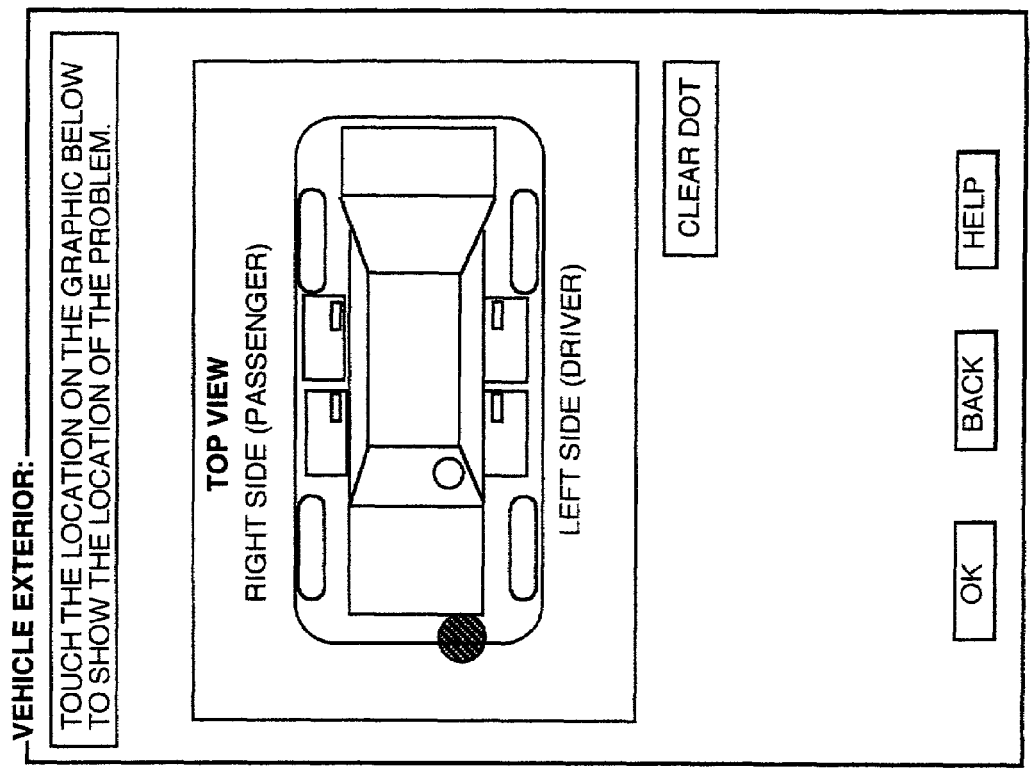
Figure 21E:
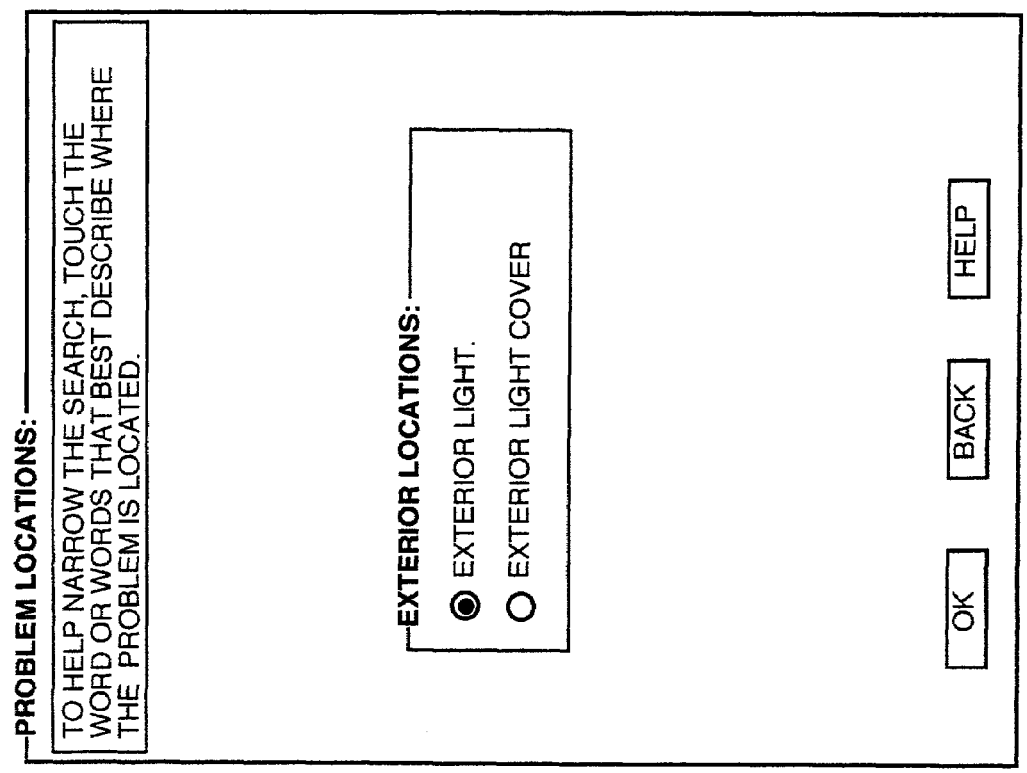
Figure 21L:
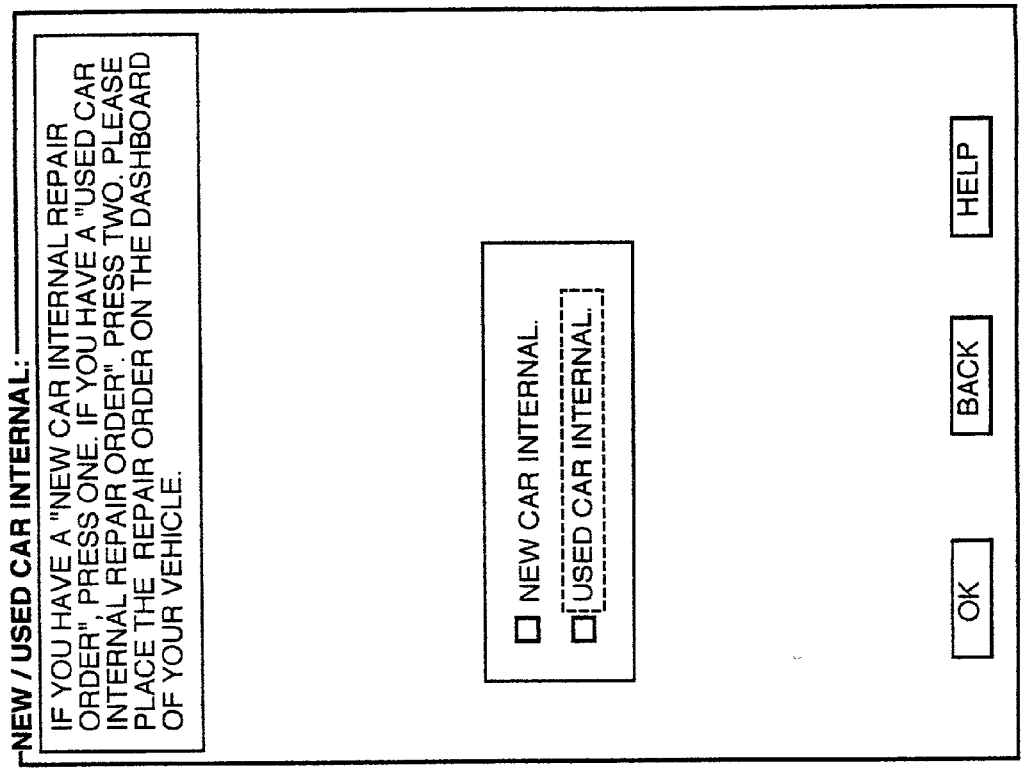
Figure 21K:
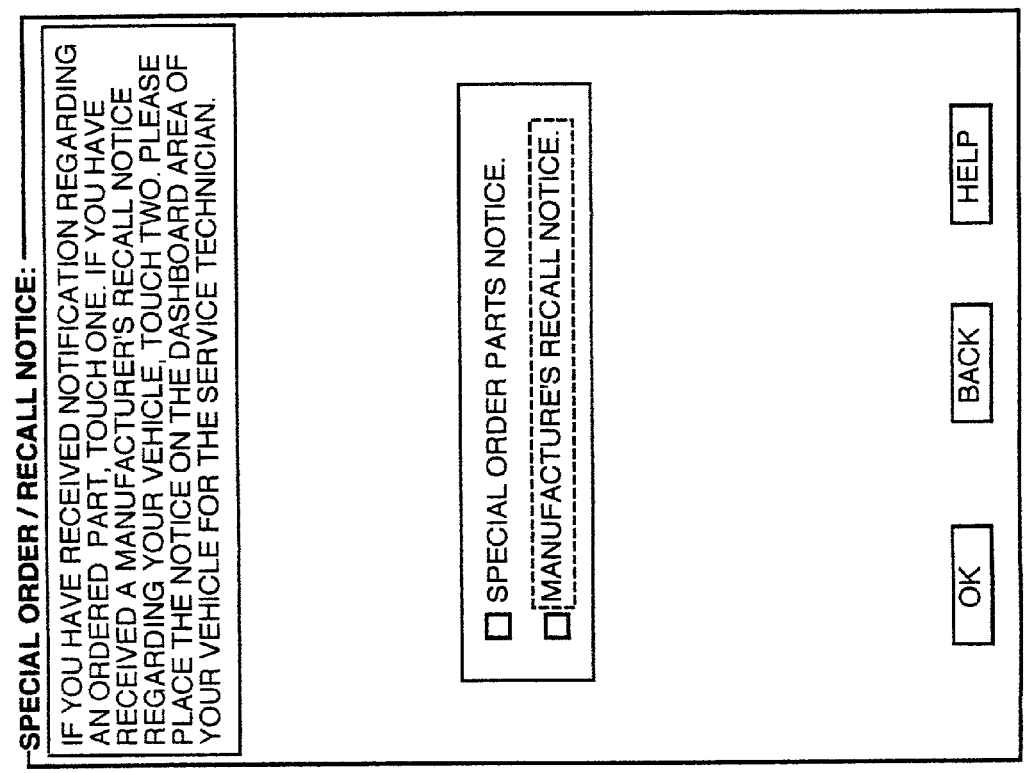

FIGS. 21A through 21S illustrates selected computer screens for the "Other services" category. FIG. 21A illustrates a screen for "Other services available" offering menu choices for scheduled and unscheduled maintenance, vehicle exterior and interior, special order parts and recall notices, new or used car internal and general symptoms. FIG. 21B illustrates a screen for "Scheduled Maintenance" and FIG. 21C illustrates a screen for "Unscheduled Maintenance". FIG. 21D illustrates a screen for the "Vehicle exterior" subcategory including questions regarding the area(s) in which the problem is occurring. FIGS. 21E through 21I provide problem location selections. FIG. 21E illustrates a screen requesting information on the problem location. FIG. 21F illustrates a screen for locating a problem on the vehicle's exterior via a diagram. FIG. 21G illustrates a computer screen for the "Vehicle interior" subcategory, including questions regarding the area where the problem occurred. FIG. 21H illustrates a screen for the "Problem location" subcategory of "Vehicle Interior lighting". FIG. 21I illustrates a screen for locating problems via a diagram. FIG. 21J illustrates a screen for describing the problem. FIG. 21K illustrates a screen for providing information regarding a special order of recall notice. FIG. 21L illustrates a screen for a "new car" or a "used car" internal repair order. FIGS. 21M through 21S illustrate screens for identifying things the customer sees, hears, smells and feels under the "help" category 140 of FIG. 2 and asks "When" and "Where."

FIGS. 22A through 22D illustrate selected computer screens for "General Questions, Other Symptoms and Return Problems."

FIG. 23 illustrates and "Additional problems" screen.

FIG. 24 illustrates a screen for selecting "Unscheduled services" and includes prices for those services.

Figure 25B:
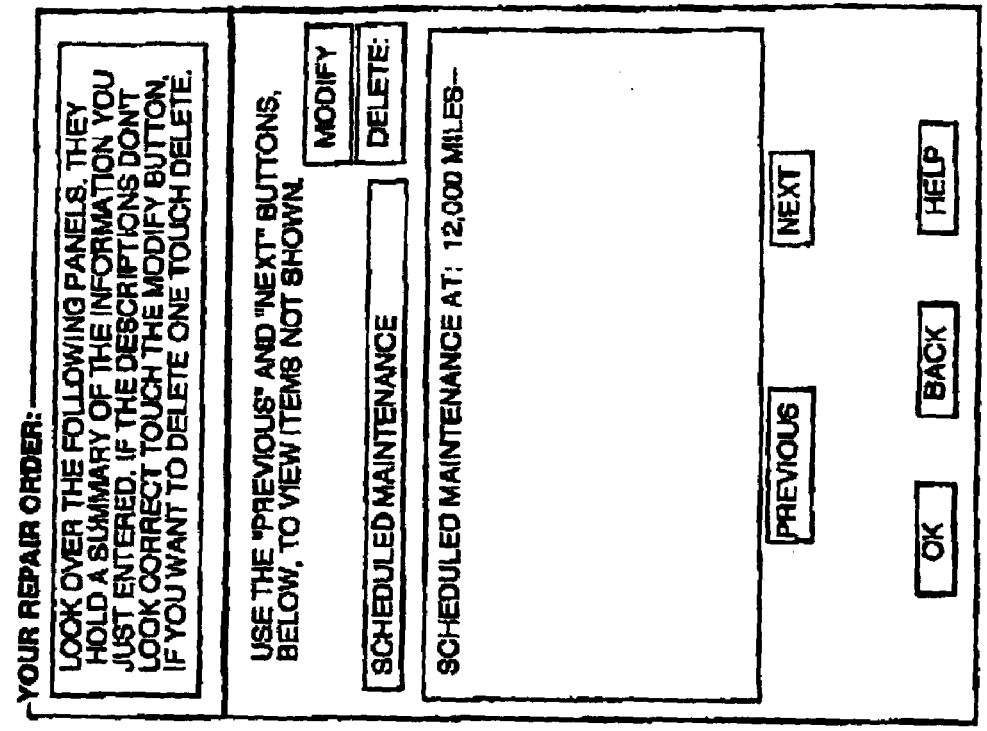
FIGS. 25A and 25b illustrate screens asking for a review the "Repair Order."
Figure 25A:
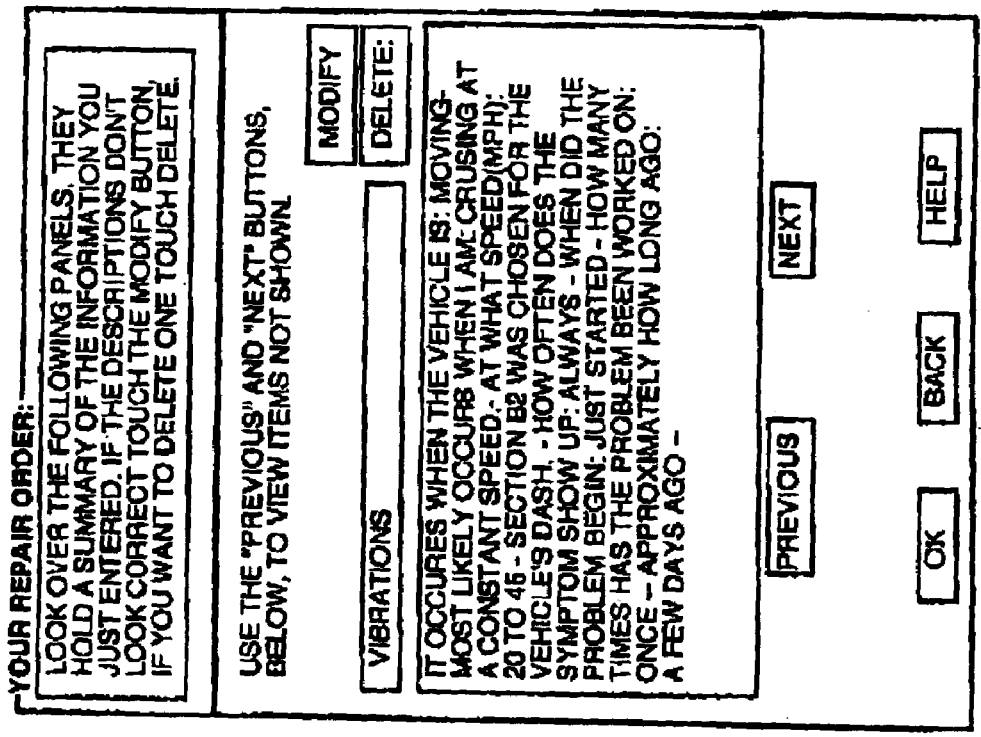

FIGS. 25A and 25B are screens requesting that the customer review the previously input material.

FIGS. 26 and 27 illustrate screens for providing an estimate of cost and pick up time.

FIG. 28 illustrates a screen for acknowledgment and capture of customer signature. This corresponds to block 170 of FIG. 2.

FIG. 29 illustrates a screen instructing the customer to deposit the vehicle keys in an appropriate lockbox.

FIG. 30 illustrates a screen for selection of "wait", "drop off", or a "loaner."

Figure 31B:
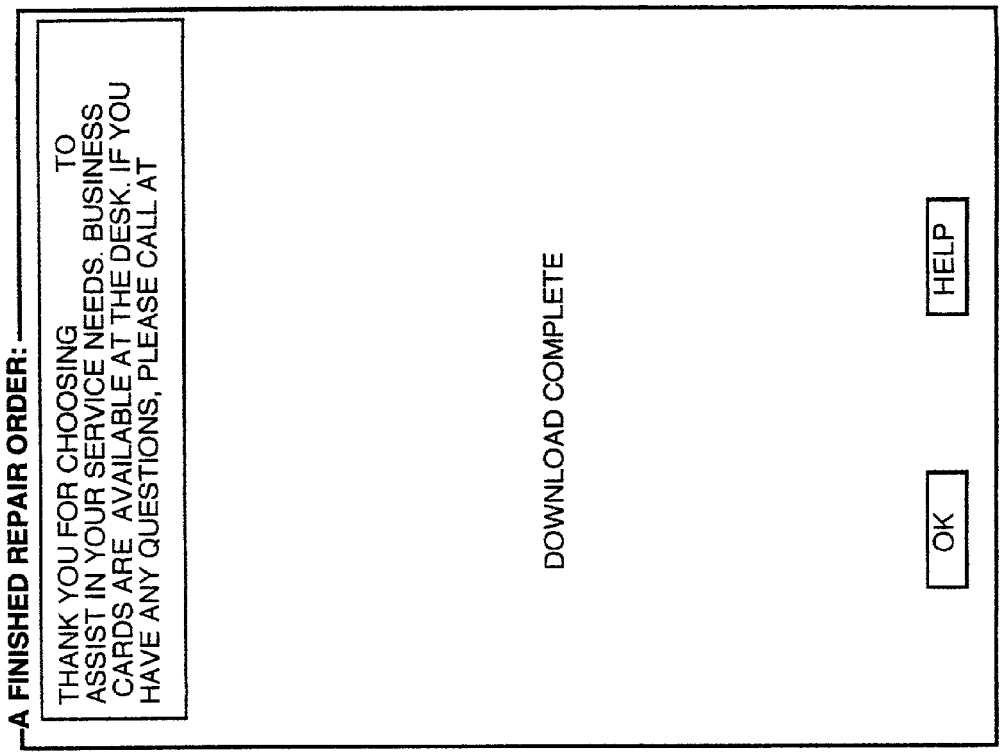
FIGS. 31A and 31B illustrate screens relating to the acceptance of the finished repair order.
Figure 31A:
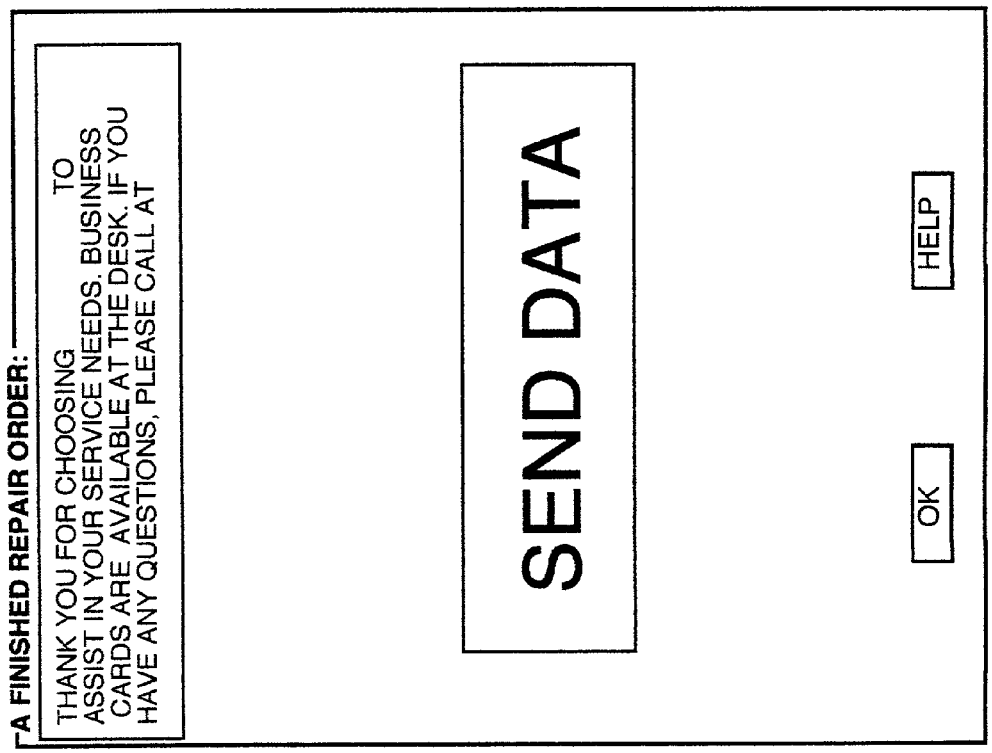

FIGS. 31A and 31B illustrate "Repair order acceptance" screens. This corresponds to block 180 of FIG. 2.

FIG. 32 illustrates a "Repair order generated" screen, including the captured customer signature.

Figure 33:
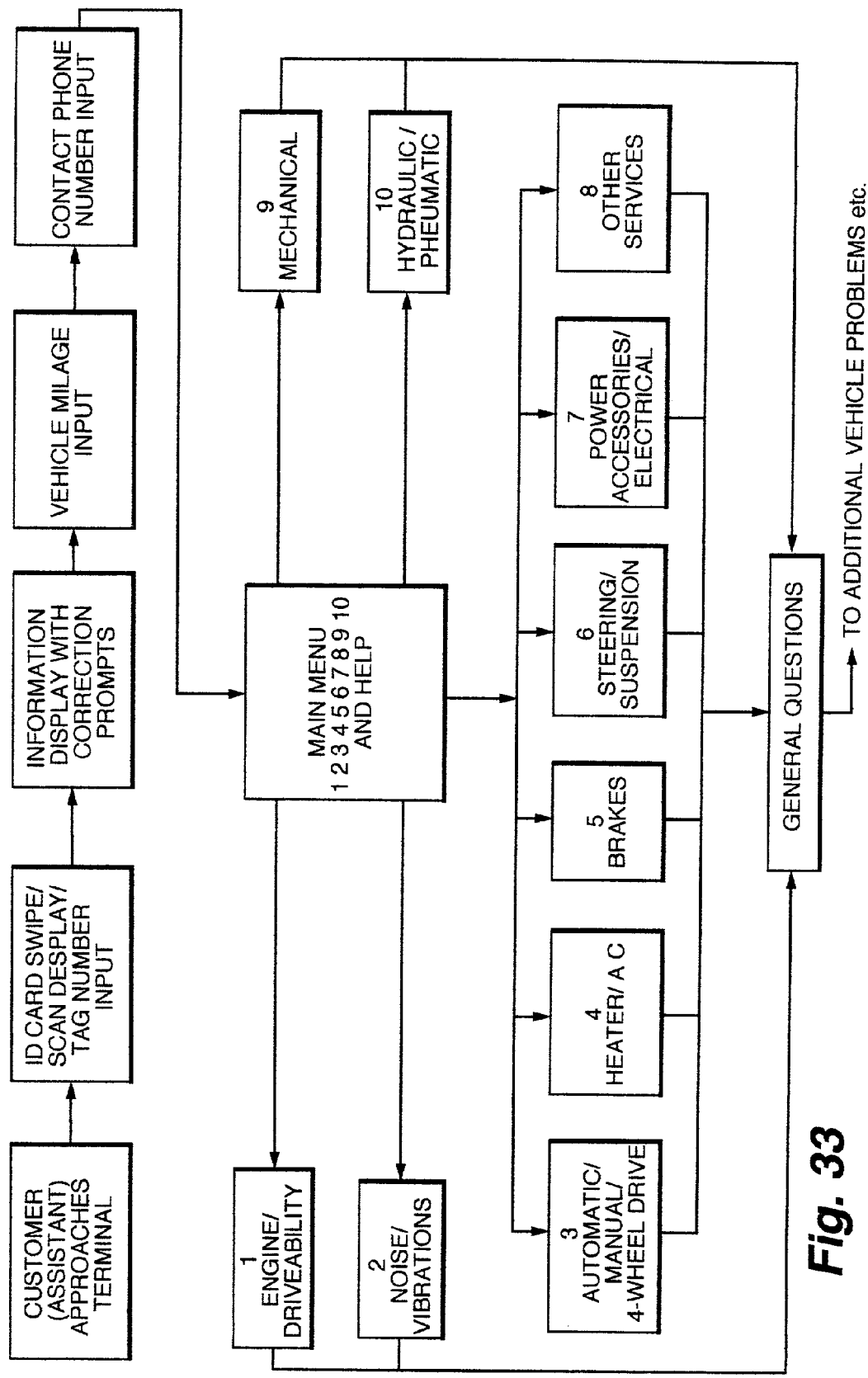
FIG. 33 is a portion of a typical flow sheet for the repair of other vehicles and equipment.

FIG. 33 illustrates the additional categories 9 and 10 of a Master Flow Sheet extending FIG. 2 for various types of vehicular equipment.

Various combinations of commercially available computer hardware can be used to assemble the system of the invention. Computer support can range from a single personal computer or a microcomputer to a master computer with multiple terminals. Portable or hand-held terminals or computers can be used to facilitate the collection and transmission of data. The computer support mechanisms preferably include a central processing unit, at least one compiler, data storage devices including disk drives and the like, at least one monitor with a display screen, a modem, an interactive media device and input/output mechanisms. The computer system is configured, as required, by the particular programs to be run with capacities and rates suitable to provide reasonable response times.

Input mechanisms can include conventional keyboards and/or keypads, interactive touch screens, and screens with icons, such a graphical user interfaces, that are responsive to manual input, devices, such as a "mouse," optical and magnetic readers, and data input ports. Preferably, the input mechanisms include touch-active display screens. Such screens permit interaction between a user and the computer in response to the user touching the screen with an object such as a finger or a pointing device. As disclosed in U.S. Pat. No. 5,537,315, such pointing devices can include a light pen, sonic pen, voltage pencil, stick, or wand. Other input mechanisms to the system, if not directly to the computer, may include smart card devices, such as conventional credit card readers, for receiving data about the customer and/or about the vehicle to be serviced, plus payment information such as credit card numbers. One suitable credit card reader is disclosed in U.S. Pat. No. 4,449,186, column 1.

Optionally, the input mechanisms can include a voice-activated system, such as a digitized voice recognition system for receiving user input, such as those pioneered by Dragon Systems, Inc., San Rafael, Calif.

The computer support mechanisms preferably include at least one hand-held or portable terminal which permits data to be input to the system via a keypad or keyboard or an equivalent device. This permits a service advisor and/or a mechanic to receive data and to input data conveniently from the vehicle. Such terminals have become commonly available and can be designed or purchased and modified to interface with the system. A representative example of such terminals is found in U.S. Pat. No. 5,468,575.

Because most contemporary automotive vehicles include onboard computers which receive information from sensors, control various systems via actuators, and record various failures of equipment, input mechanisms for the system include mechanisms for reading and analyzing data from such onboard computers. Any suitable mechanism can be used which allows such data to be read, analyzed, and input to the computer or to the system. One example is the "hand-held automotive diagnostic service tool", of U.S. Pat. No. 5,541,840, which is incorporated herein by reference. As disclosed in U.S. Pat. No. 4,602,127, many modern vehicles include mechanisms for obtaining direct access to the data of such onboard computers on a real-time basis. Inputs to the system can also be provided by automatic vehicle recognition and diagnostic systems such as those disclosed in U.S. Pat. No. 5,557,268.

Output mechanisms can include display mechanisms, such as CRT display screens of computer monitors, printers, and program-actuated facsimile, credit checking devices, and/or telephone devices. The printer(s) can be any suitable unit(s) selected from commercially available models, such as laser or ink jet printers.

Computer programs or software subsystems or modules are used to carry out various tasks for which the systems are employed. Many of these subsystems can be obtained or modified from existing commercial programs. In any case, the required programs can readily be provided by those of ordinary skill in the art in view of the teachings herein. For instance, accounting and billing programs are readily available and can be obtained or modified to provide a statement of account for services performed. Programs for receiving and analyzing the data stored in vehicle onboard computers are also available. However, the most important part of the diagnostic process will still generally be the analysis by the mechanic and/or service manager of the information provided by such programs and the vehicle's driver. Service order writing programs are generally available; see, e.g., U.S. Pat. No. 5,058,044.

Programs to generate and/or to access a service record for the vehicle(s) being serviced are also available. Technical library or database programs can be used to provide access to scheduled and unscheduled maintenance operations, service and parts manuals for the mechanic as well as for the customer. Programs for identifying and ordering parts are also available. However, such programs will generally be tailored or prepared especially for users of the particular systems of the invention.

The figures provide an exemplary mechanism for obtaining the vehicle driver's input. They do not include a listing of all possible options with respect to automobiles. Additional categories 9 for "Mechanical" systems and 10 for "Hydraulic or Pneumatic" systems include the "What", "Where", and "When" questions of the previous categories, and will provide feedback subroutines necessary to handle vehicles other than automobiles and mechanical equipment for grading, lifting, moving, etc., various items and/or products.

Figure 34:
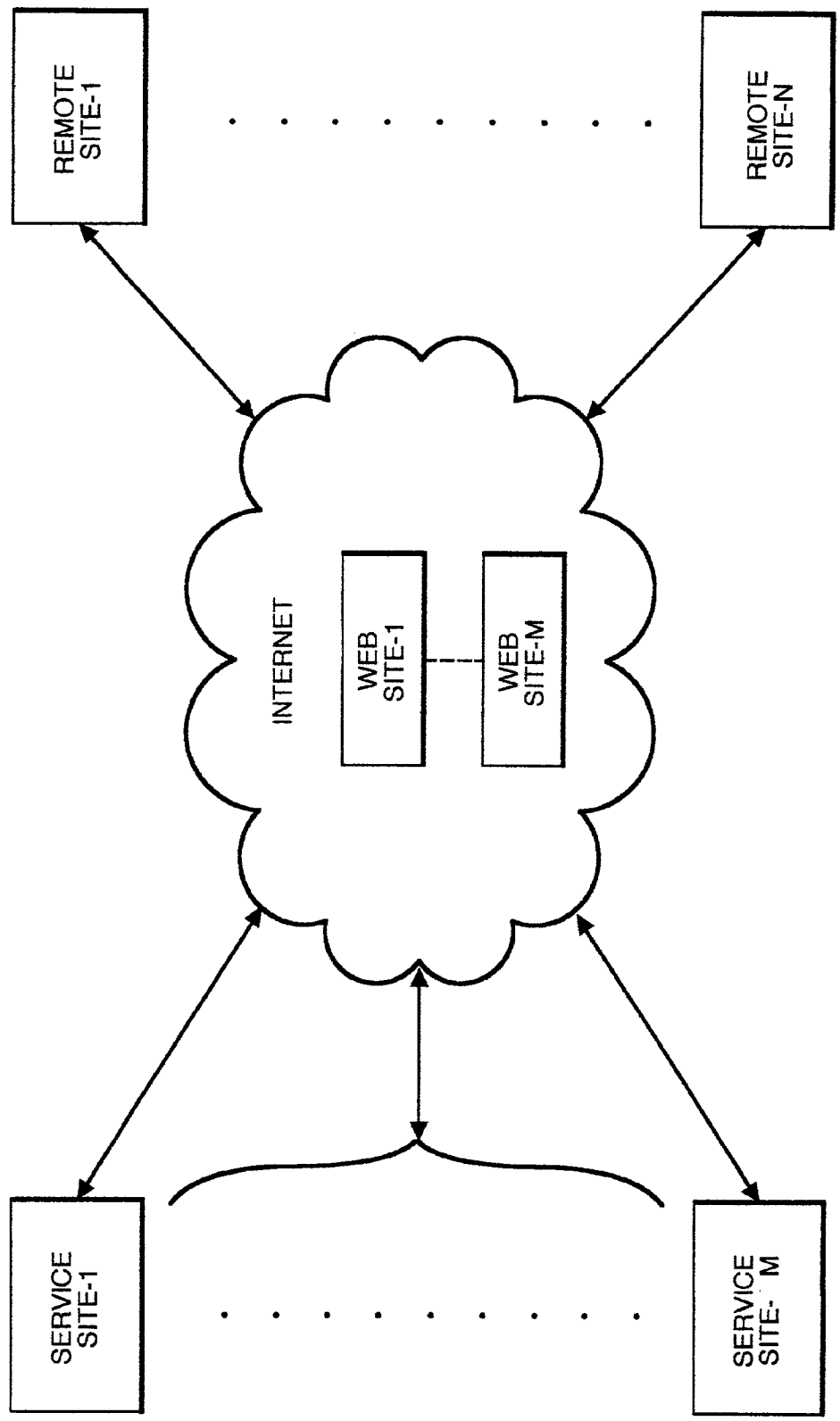
FIG. 34 shows the use of the Internet to communicated between service sites and remote sites at which owners of equipment to be serviced are located.

FIG. 34 shows a feature of the invention whereby a plurality N of geographically spaced remote sites and a plurality of geographically spaced service sites are enabled to bi-directionally communicate through the use of the well-known Internet, as is above-described in accordance with the invention.

Each individual remote site is designated as a remote site 1 through a remote site N, and each individual service site is designated as a service site 1 through a service site M. Each of the remote sites 1 through N can, for example, comprise a personal computer (PC) that is located within the home of an individual equipment or automobile owner, wherein each service site 1 M may comprise a PC that is located within the service facility of an equipment repair company, such as the repair department of a automobile dealership.

Each one of the individual services sites 1 through M provides for its own web site within the Internet, these individual web sites being designated web site 1 through web site M, wherein web site 1 corresponds to service site 1, etc.

Computing equipment at each of the customer sites (i.e., remote sites) and at each of the service sites enables bi-directional communication between the customer sites and the service sites by way of the Internet.

Each of the web sites 1 through M is constructed and arranged to enable any given customer site 1 through N to input information relative to a piece of equipment or automobile that is to be serviced, as is described above.

In some cases, a given service site may provide service for only one type of equipment. In other cases, a given service site may provide service for a number of types of equipment, for example a number of different branches of automobile. In this later case, that service site's web site is constructed and arranged to enable a customer site to initially make a selection as to the particular type/brand of equipment that is to be serviced, this being followed by the inputting of information in accordance with the invention and as described above, relative to the particular type/brand of equipment that is to be serviced.

For example, should the automobile owner at remote site 32 desire to have his/her brand X automobile serviced by service site 5, this owner uses a PC, perhaps at his/her home, to access web site 5. If service site 5 services more that one brand of automobile, the owner at customer site 3 now accesses that portion of web site 5 that is associated with the brand X automobile. Thereafter, the owner at customer site 3 inputs information as above described relative to the service that is needed and/or relative to unusual operating symptoms that the owner has experienced relative to his/her particular brand X automobile.

The brand X owner may propose a time/date at which this particular automobile will be brought to service site site 5 for service. Upon receipt of this Internet communication from remote site 3, service site 5 responds by sending a confirmation of service message, perhaps proposing a different time/date. Thus, by way of a two-way Internet communication between remote site 3 and service site 5, an agreement is reached that facilitates the servicing of this particular brand X automobile by service site 5.

Figure 35:
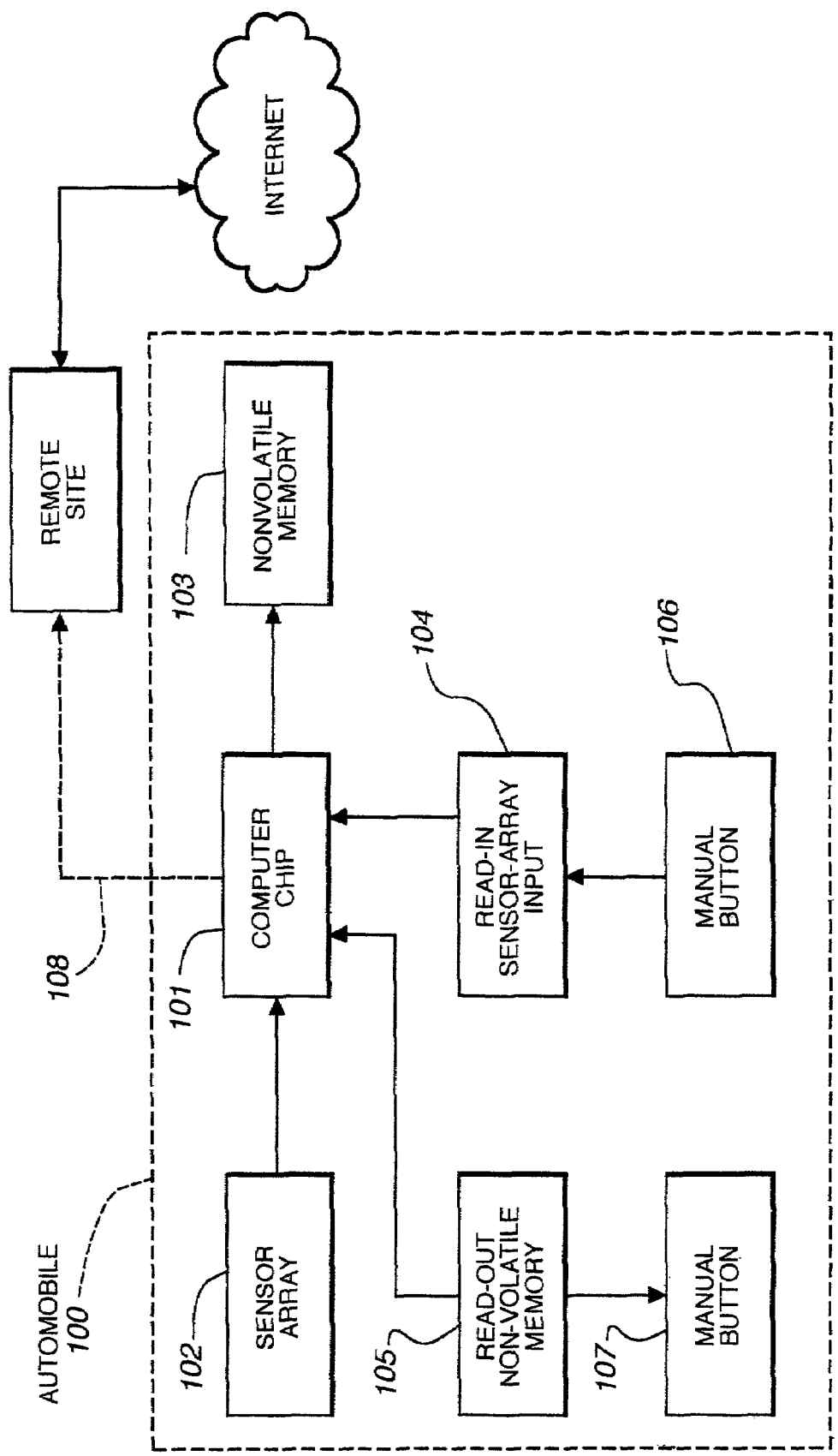
FIG. 35 shows an automobile having a sensor array, a manually operable button that is to be activated when an abnormal mode of operation of the automobile is experimented, whereupon all sensed operating conditions of the automobile are recorded in memory, the later transmission to a selected service site.

FIG. 35 shows a feature of the invention whereby a snap shot of the operating state of a piece of equipment is instantaneously captured, for later use in defining the operating parameters of the equipment as they existed at the time that the operator of the equipment experienced an unusual mode of operation of the equipment, this unusual mode of operation perhaps indicating the need to service the equipment. While this feature of the invention will be described relative to an automobile, the spirit and scope of this feature of the invention is not to be limited thereto. The snap shot of operating conditions allows a service technician to duplicate the symptom as well as the operating conditions that caused the symptom to aid in the repair.

In FIG. 35, dotted outline 100 designates a piece of equipment, such as an automobile, that contains a computer chip 101, a sensor array 102, non-volatile memory 103, a first network 104 whose activation enables computer chip 101 to instantaneously read the state of sensor array 102 and to store the content of sensor array 102 within non-volatile memory 103, a second network 105 whose activation enables computer chip 101 to read out the content of non-volatile memory 103, a first manually operable button 106 that activates first network 104, and perhaps a second manually operable button 107 that enables second network 105.

Sensor array 102 could comprise a large number of individual sensors or one sensor, the detail of which is not critical to the invention. It suffices to say that sensor array 102 is operable to monitor the instantaneous state of operation of at least one operating parameter of automobile 100.

More generally, sensor array 102 monitors the operation of a number of automobile components, and the state of a number of operating conditions of the automobile, which components/conditions may generate symptom-related outputs that are of interest to service personnel when analyzing symptoms, and thereafter determining procedures for servicing the automobile.

By way of non-limiting examples, sensor array 102 may monitor tire pressure, vehicle speed, engine revolutions (RPM), engine temperature, engine oil pressure, hydraulic steering/brake/transmission pressures, automobile vibration, the angle of front wheel turning, air conditioner on or off, heater on or off, brakes applied or not applied, various electrical accessories on or off, automobile noise level, convertible top up or down, and the transmission range that is currently operative to apply engine power to the drive wheels.

When the operator of automobile 100 experiences (i.e., senses) an abnormal mode of operation of the automobile, the operator manually actuators button 106 that is mounted, for example, on the steering wheel of the automobile. This action by the operator enables network 104 whereby computer chip 101 is commanded to read-out sensor array 102 and to store the content of sensor array 102 in non-volatile memory 103.

Later, when requesting service of automobile 100, the owner connects computer chip 101 to the service cite, and in response to a symptom query form the service site, the stored symptom content of memory 103 is presented to the service site. When the owner's automobile 100 is located at a FIG. 34 remote site, the content of memory 103 is presented to the remote site by using a cable 108, or other equivalent communication link, (including wireless protocols) to connect computer chip 101 to the remote site, whereupon the stored symptom content of memory 103 is presented to the service site by way of Internet.

When communication involves using the Internet, the owner accesses a desired web site, as above described relative to FIG. 34. Later, when the owner reaches the appropriate web site screen wherein the operating parameters or operating symptoms of the automobile are requested, the owner actuates button 107 (which may be located within automobile 100 or which may be located at the remote site), whereupon computer chip 101 reads out the content of non-volatile memory 103 to the Internet and to the desired web site and service site.

While the two actuating means 107 and 107 have been described as manual operable means, the spirit and scope of the invention includes the use of other equivalent actuating means, non-limiting examples of which include voice responsive actuating means and radio frequency actuating means.

In addition, while the manner of communicating the content of memory 103 to a remote site has been described as using a cable 108, the spirit and scope of the invention includes the use of other equivalent communicating means, a non-limiting example is a RF communicating means.

After the stored symptom content of memory 103 has been presented to the service site, memory 103 is erased to prepare for another occasion of use in response to the occurrence of an abnormal mode(s) of operation of automobile 100.

What is claimed is:

1. An interactive communication system enabling a lay person to record and communicate operating conditions and symptoms of equipment when an abnormal mode of operation is experienced to skilled service personnel, to enable said service personnel to thereafter perform service on said equipment in accordance with said operating symptoms to diagnose and correct said abnormal mode, comprising:

a sensor array associated with said equipment;

said sensor array providing a plurality of outputs indicative of a plurality of operating conditions of said equipment that occur as said lay person operates said equipment;

memory means associated with said equipment;

first control means responsive to an action by said lay person;

actuation of said first control means by said lay person operating to cause said plurality of outputs of said sensor array to be stored in said memory means associated with said equipment when said lay person actuates said first control means in response to said lay person experiencing an abnormal mode of operation of said equipment;

a query generator at a service site for generating a symptom-related query;

a presentation device for receiving said symptom-related query and for presenting said symptom-related query to said lay person;

second control means responsive to an action by said lay person in response to said symptom-related query; and said second control means being operable to provide a content of said memory means to said service site for analysis by said service personnel.

2. The interactive communication system of claim 1 wherein said service site and said equipment are located at geographically remote sites and wherein the Internet is utilized to send said symptom-related query and said content of said memory means.

3. The interactive communication system of claim 1 wherein said equipment is an automobile.

4. The interactive communication system of claim 3 wherein said first control means is associated with a portion of said automobile that is utilized as said automobile is operated.

5. A method enabling a lay person at an equipment site to record and communicate operating conditions of equipment during an abnormal mode of operation to skilled service personnel at a service site to thereby enable said service personnel to thereafter perform service on said equipment based upon said operating symptoms to diagnosis and correct the abnormal mode of operation, comprising the steps of:

providing a sensor array on said equipment;

said sensor array providing a plurality of outputs that are indicative of a plurality of operating conditions of said equipment that occur as said lay person operates said equipment;

providing memory means on said equipment;

providing first control means on said equipment responsive to an action by said lay person as said lay person operates said equipment;

actuation of said first control means by said lay person causing said plurality of outputs of said sensor array to be stored in said memory means recording operating conditions associated with said equipment at a time when said lay person actuates said first control means in response to said lay person experiencing an abnormal mode of operation of said equipment;

providing a query generator at a service site for generating a symptom-related query to said equipment site;

providing a presentation device at said equipment site for receiving said symptom-related query and for presenting said symptom-related query to said lay person;

providing second control means responsive to actuation by said lay person in response to said symptom-related query; and providing a content of said memory means to said service site for analysis by said service personnel in response to actuation of said second control means.

6. The method of claim 5 wherein said service site and said equipment site are geographically spaced, and wherein the Internet is utilized to send said symptom-related query to said equipment site and to send said content of said memory means to said service site.

7. The method of claim 5 wherein said equipment is an automobile.

8. The method of claim 7 wherein said first control means is associated with a portion of said automobile that is utilized by said lay person as said automobile is operated by said lay person.

9. An Internet-based system for providing interactive communication between a plurality of service sites and a plurality of equipment sites at which a plurality of equipment needing service due to abnormal operating mode is operated by an equipment operator comprising:

a sensor array, memory and a manual actuator at each of said plurality of equipment;

actuation of said actuator by an equipment operator when an abnormal mode of operation of a given equipment at a corresponding equipment site is experienced by said equipment operator causing equipment operating conditions sensed by said sensor array be to stored in said memory of said given equipment;

first means at said corresponding equipment site for causing a request for service to be sent via the Internet from said corresponding equipment site to a selected service site;

query means at said selected service site responsive to said request for service for sending a symptom query via the Internet from said selected service site to said corresponding equipment site;

second means of said corresponding equipment site responsive to said symptom query for sending a content of said memory of said given equipment via the Internet from said corresponding equipment site to said selected service site; and a compiler at said given service site responsive to said content of said memory of said given equipment for providing a service plan based upon said content of said memory of said given equipment.

10. The system of claim 9 wherein said plurality of service sites are a plurality of automobile service sites, and wherein said plurality of equipment are a plurality of automobiles.

11. A method allowing a lay person to submit operating conditions and symptoms relating to a malfunction of equipment, and allowing a service provider to generate a chart of operating conditions and symptoms for use in servicing said equipment; comprising the steps of:

providing a sensor array having a plurality of outputs corresponding to a plurality of operating conditions of said equipment;

providing memory on said equipment;

providing an actuator on said equipment;

instantaneous operation of said actuator causing instantaneous values of said plurality of outputs corresponding to said plurality of operating conditions of said sensor array to be stored in said memory;

initiating a request for service to said service provider by said lay person, said request indicative of the symptoms relating to said malfunction of said equipment;

in response to said request, querying said lay person for operating conditions of said equipment by said service provider;

in response to said query, providing a content of said memory to said service provider by said lay person;

in response to receiving said content of said memory, compiling said content of said memory at said service provider; and outputting a chart of operating conditions and symptoms of said equipment based upon said compilation, said chart for use by said service provider, and said chart having sufficient information so said lay person does not need to have direct communication with said service provider when leaving said equipment with said service provider.

12. The method of claim 11 wherein said instantaneous operation of said actuator is based upon operation of said equipment as sensed by the five human senses of said lay persons and as said lay person operates said equipment.

13. The method of claim 12 including the step of:
instructing said lay person how to leave said equipment with said service provider, and how and when to claim said equipment following service of said equipment by said service provider.

14. The method of claim 13 including the step of:
capturing a signature of said lay person to provide authorization to said service provider.

* * * * *